United States Patent

Kobayashi et al.

[11] Patent Number: 5,777,451
[45] Date of Patent: Jul. 7, 1998

[54] VEHICLE LONGITUDINAL SPACING CONTROLLER

[75] Inventors: Masanori Kobayashi; Taketoshi Kawabe, both of Ageo, Japan

[73] Assignee: Nissan Diesel Motor Co., Ltd., Ageo, Japan

[21] Appl. No.: 719,676

[22] Filed: Sep. 25, 1996

[30] Foreign Application Priority Data

Mar. 8, 1996 [JP] Japan ................... 8-051829

[51] Int. Cl.⁶ .................. G08G 1/00; B60K 31/00
[52] U.S. Cl. ........... 318/587; 318/568.1; 318/480; 180/169; 364/424.02
[58] Field of Search ............... 318/139, 587, 318/560–630; 180/167–170; 364/424.02, 426; 901/1; 395/80–99; 356/5.09, 28.5; 455/33.1, 33.4; 104/27, 295

[56] References Cited

U.S. PATENT DOCUMENTS

| | | | |
|---|---|---|---|
| 3,708,668 | 1/1973 | Tilley | 250/202 |
| 4,202,048 | 5/1980 | Edwards | 367/40 |
| 4,473,787 | 9/1984 | Schick | 318/587 |
| 4,477,184 | 10/1984 | Endo | 356/141 |
| 4,783,618 | 11/1988 | Artrip | 318/587 |
| 5,081,703 | 1/1992 | Lee | 455/13 |
| 5,091,855 | 2/1992 | Umehara et al. | 364/424.02 |
| 5,267,173 | 11/1993 | Tanizawa et al. | 364/478 |
| 5,278,892 | 1/1994 | Bolliger et al. | 379/60 |
| 5,400,864 | 3/1995 | Winner et al. | 180/169 |
| 5,473,233 | 12/1995 | Stull et al. | 318/587 |
| 5,548,806 | 8/1996 | Yamaguchi et al. | 455/33.1 |
| 5,548,816 | 8/1996 | DeVaney | 455/53.1 |
| 5,621,514 | 4/1997 | Paranto et al. | 356/5.09 |

*Primary Examiner*—Paul Ip
*Attorney, Agent, or Firm*—Foley & Lardner

[57] ABSTRACT

A frontmost vehicle and a plurality of following vehicles are driven together in a line as a group. A virtual cell is set for each vehicle, allowing a predetermined distance in front of and behind the vehicle, and a virtual cell front end position of the frontmost vehicle is indicated from outside. A value obtained by adding the length of the virtual cell to the virtual cell front end position is transmitted to the following vehicle as the virtual cell front end position of the following vehicle. A relative position in the virtual cell of each vehicle is detected, and by controlling this relative position to a preset target position, the inter-vehicle distance is reduced and the generation of dilatational waves between the vehicles is prevented.

13 Claims, 23 Drawing Sheets

VEHICLE LONGITUDINAL SPACING CONTROLLER

FIELD OF THE INVENTION

This invention relates to a longitudinal spacing controller for causing a plurality of automatically driven vehicles to drive close to each other.

BACKGROUND OF THE INVENTION

"A REPORT ON THE DEVELOPMENT OF A SUPER SMART VEHICLE SYSTEM AND RELATED TECHNOLOGY" published in March 1993 by the Mechanical Systems Promotion Council in Japan discloses the four systems shown in FIGS. 23A–23D for automatically driving a plurality of vehicles joined together as a platoon in a line behind the frontmost vehicle (referred to hereinafter as platoon leader) at a predetermined short distance from each other.

In all of these systems, the accelerators and brakes are controlled so as to drive the platoon leader 1 and the following vehicles 2 such that there is a predetermined distance between them.

In the system shown in FIG. 23A, each of the vehicles 2 measures the inter-vehicle distance to a preceding vehicle, and the accelerator and brake are controlled based on this measured inter-vehicle distance so that a target inter-vehicle distance is maintained.

In the system shown in FIG. 23B, a vehicle-to-vehicle communications system is also provided between the preceding and following vehicles. Each of the vehicles 2 then controls the accelerator and brake so as to maintain a target inter-vehicle distance based on the aforesaid measured value of the inter-vehicle distance and the vehicle communication data, e.g., vehicle speed, of the vehicle in front obtained by the vehicle-to-vehicle communications system.

In the system shown in FIG. 23C, a vehicle-to-vehicle communications system is provided between all the vehicles, communication data are provided by the platoon leader in addition to the preceding vehicle, and the accelerator and brake are controlled so as to maintain a target inter-vehicle distance based on this information and the measured inter-vehicle distance to the preceding vehicle.

In the system shown in FIG. 23D, a control center 3 which controls all the vehicles is provided, each vehicle exchanges travel information with the preceding vehicle by inter-vehicle communication, and the accelerator and brake are controlled according to instructions and commands from the central control center 3.

In the systems shown in FIG. 23A and FIG. 23B, speed changes of the platoon leader 1 are progressively transmitted to the following vehicles 2. This means that speed changes of the platoon leader 1 are transmitted directly only to the vehicle 2 immediately following it, and as a result, when there are many vehicles in the line, a dilatational wave tends to be set up between the vehicles. This dilatational wave is especially serious when there are large differences in the performance and characteristics of the vehicles, hence the target value of the inter-vehicle distance has to be set large in order to take the dilatational wave into account.

In the systems shown in FIG. 23C and FIG. 23D, the vehicles are controlled using vehicle-to-vehicle communication data about the platoon leader 1 so inter-vehicle dilatational waves are suppressed to some extent, however this requires a complex communications system between all the vehicles in the platoon. Further, in the system of FIG. 23D, the whole platoon of vehicles is controlled while making inter-vehicle adjustments. It is then necessary to know the characteristics and performance of each vehicle, which makes it extremely difficult to design the control system including the control center 3.

SUMMARY OF THE INVENTION

It is therefore an object of this invention to reduce an inter-vehicle distance without using a complex communications system.

It is a further object of this invention to prevent generation of a dilatational wave in the inter-vehicle distance.

In order to achieve the above objects, this invention provides a controller for controlling platooning of vehicles driving in a line, each of these vehicles having a travel speed varying mechanism for varying a travel speed of the vehicle. The controller comprises a mechanism for setting a virtual cell for each vehicle allowing a predetermined distance in front of and behind the vehicle, a first transmitting mechanism for transmitting a signal indicative of a virtual cell front end position of a frontmost vehicle in the group to the frontmost vehicle, a mechanism for calculating a virtual cell front end position of a (i+1)th vehicle from the frontmost vehicle, from a virtual cell front end position and a virtual cell of a ith vehicle, where i ranges from 1 to the total number of vehicles in said group, a second transmitting mechanism for transmitting a signal indicative of the virtual cell front end position of the (i+1)th vehicle to the (i+1)th vehicle, a mechanism for setting a target position of each vehicle in the virtual cell, a mechanism for detecting a real position of each vehicle in the virtual cell, and a mechanism for controlling the travel speed varying mechanism such that the real position coincides with the target position of each vehicle.

It is preferable that each vehicle is provided with the virtual cell setting mechanism, the target position setting mechanism, the real position detecting mechanism and the control mechanism, that each vehicle except the last vehicle in the group is provided with the calculating mechanism and the second transmitting mechanism, and that the first transmitting mechanism is provided independently of the group.

It is also preferable that the controller further comprises magnetic nails emitting magnetic pulses disposed at equidistant intervals on a road on which the group is traveling, and the position detecting mechanism comprises a magnetic sensor for detecting the magnetic pulses and a pulse counter for integrating the pulses.

It is also preferable that the position detecting mechanism comprises a GPS receiver.

It is also preferable that the first transmitting mechanism comprises a base station for specifying the virtual cell front end position of the frontmost vehicle with time and a transmitting device for transmitting the virtual cell front end position to the frontmost vehicle.

It is also preferable that the controller further comprises a mechanism for detecting a vehicle speed of each vehicle, and the virtual cell setting mechanism sets the virtual cell to a larger value the larger the vehicle speed.

It is also preferable that the controller further comprises a mechanism for detecting a weight of each vehicle, and the virtual cell setting mechanism sets the virtual cell to a larger value the larger the weight.

It is also preferable that the controller further comprises a mechanism for detecting a frictional coefficient between the tires of the vehicles and a road surface on which the vehicles are traveling, and the virtual cell setting mechanism sets the virtual cell to a larger value the smaller the frictional coefficient.

It is also preferable that the controller further comprises a mechanism for detecting a rainfall, and the virtual cell setting mechanism sets the virtual cell to a larger value when the rainfall is detected.

It is also preferable that the controller further comprises a mechanism for detecting a throttle opening of an engine driving each vehicle, a mechanism for detecting a travel speed of each vehicle, and a mechanism for determining whether or not each vehicle is traveling on a descending slope based on the throttle opening and travel speed of each vehicle, and that the virtual cell setting mechanism sets the virtual cell to a larger value when the vehicle is traveling on a descending slope.

It is also preferable that the controller further comprises a mechanism for detecting a gradient of a road surface on which the vehicles are traveling, and the virtual cell setting mechanism sets the virtual cell based on the road surface gradient.

It is also preferable that the controller further comprises a mechanism for arbitrarily varying the virtual cell of each vehicle.

It is also preferable that the controller further comprises a mechanism for calculating a standard deviation of difference between the real position and the target position of each vehicle, and the virtual cell setting mechanism sets the virtual cell to a larger value the larger the standard deviation.

The details as well as other features and advantages of this invention are set forth in the remainder of the specification and are shown in the accompanying drawings.

DESCRIPTION OF THE PREFERRED EMBODIMENTS

Figure 1:
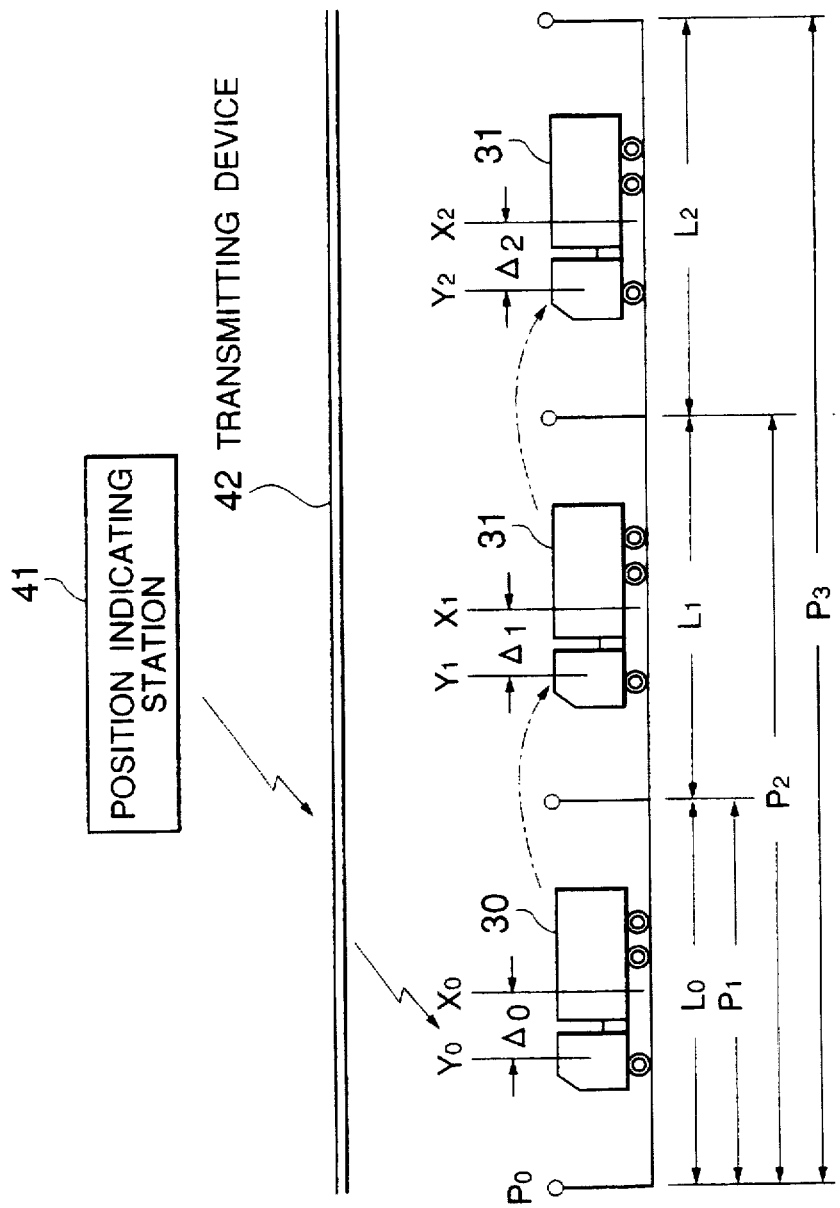
FIG. 1 is a schematic diagram of a vehicle longitudinal spacing controller according to a first embodiment of this invention.

Referring to FIG. 1 of the drawings, a group of vehicles 31 are running in a line behind a platoon leader 30 while a predetermined interval is maintained between them.

A base station which guides the travel of the group of vehicles, comprising a position indicating station 41, and a transmitting device 42 which may comprise for example a leak wave cable or the like that transmits a command signal output by the position indicating station along the road, is installed in the system.

A predetermined virtual cell $L_i$ is preset for each vehicle. This virtual cell $L_i$ is separately set for each vehicle based on the vehicle length, vehicle performance and desired inter-vehicle distance. A relative position of the vehicle in the virtual cell $L_i$, i.e. a distance $X_i$ from the front end of the virtual cell $P_i$ to the reference position of the vehicle, is set for each vehicle.

Figure 2:
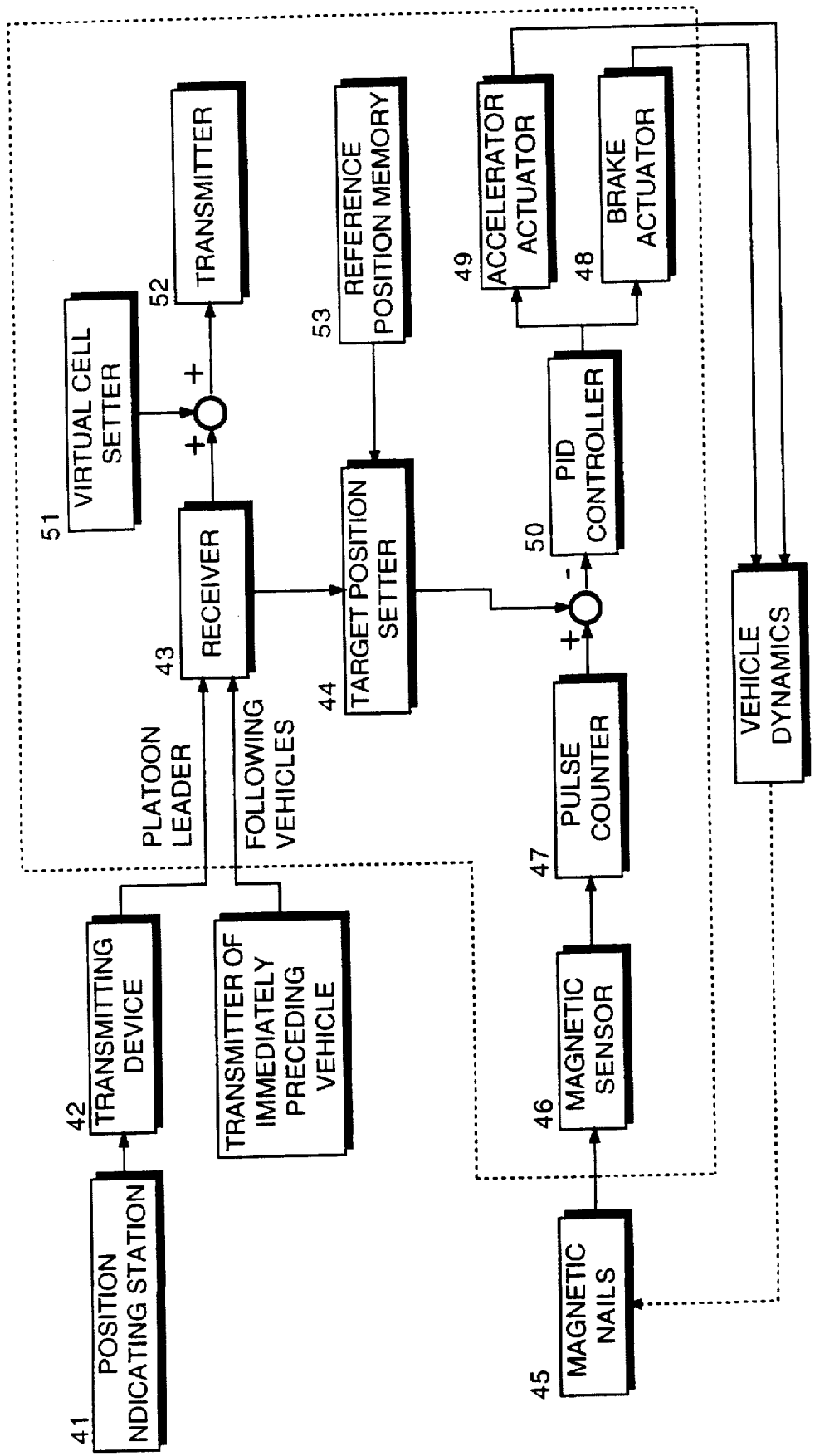
FIG. 2 is a block diagram describing the functions of the controller.

Each vehicle comprises an actuator 48 for varying an engine throttle opening and an actuator 49 for braking the vehicle so that the acceleration and deceleration of each vehicle are independently controlled as shown in FIG. 2. A vehicle-mounted receiver 43, virtual cell setter 51, vehicle-mounted transmitter 52, reference position memory 53, target position setter 44, magnetic sensor 46, pulse counter 47 and PID (Proportional, Integral and Differential) controller 50 are also provided. The target position setter 44, pulse counter 47, PID controller 50 and virtual cell setter 51 comprise for example microprocessors.

A large number of magnetic nails 45 are embedded at equidistant intervals in the road surface over which the group of vehicles is traveling.

In the platoon leader 30, these mechanisms operate in the following way. The vehicle-mounted receiver 43 receives a command signal indicating a virtual cell front end position $P_0$ output by the position indicating station 41 via the transmitter 42. This command signal varies with time based on the target travel speed of the group of vehicles.

The virtual cell setter 51 stores a virtual vehicle cell $L_0$ in an internal memory. The vehicle-mounted transmitter 52 sends $P_1=P_0+L_0$, to the immediately following vehicle, i.e., the first following vehicle as a virtual cell front end position of the first following vehicle 31. A reference position $X_0$ of the vehicle in the virtual cell $L_0$ is stored in the reference position memory 53. The target position setter 44 calculates a target position $P_0+X_0$ from the virtual cell front end position $P_0$ and the reference position $X_0$. The magnetic sensor 46 detects magnetic pulses from the magnetic nails 45 on the road surface. The pulse counter 47 integrates these detected pulses. The PID controller 50 calculates a difference $\Delta_0$ between the present position $P_0+Y_0$ of the vehicle calculated from the integral value and the target position $P_0+X_0$, and controls the actuators 48, 49 such that $\Delta_0$ is 0.

In the first following vehicle 31, the vehicle-mounted receiver 43 receives the virtual cell front end position $P_1$ from the platoon leader 30. The virtual cell setter 51 stores a virtual cell $L_1$ of the vehicle. The vehicle-mounted transmitter 52 sends $P_2=P_1+L_1$ to the second following vehicle 31, as a virtual cell front end position of the second following vehicle 31. A reference position $X_1$ of the vehicle in the virtual cell $L_1$ is stored in the reference position memory 53. The target position setter 44 calculates a target position $P_1+X_1$ from the virtual cell front end position $P_1$ and the reference position $X_1$. The PID controller 50 calculates a difference $\Delta_1$ between the present position $P_1+Y_1$ of the vehicle found from the magnetic sensor 46 and pulse counter 47, and the target position $P_1+X_1$, and controls the actuators 48, 49 such that $\Delta_1$ is 0.

In the second following vehicle 31, the vehicle-mounted receiver 43 receives the virtual cell front end position $P_2$ from the first following vehicle 31. The virtual cell setter 51 stores a virtual cell $L_2$ of the vehicle. The vehicle-mounted transmitter 52 sends $P_3=P_2+L_2$ to the third following vehicle 31, as a virtual cell front end position of the third following vehicle 31. A reference position $X_2$ of the vehicle in the virtual cell $L_2$ is stored in the reference position memory 53. The target position setter 44 calculates a target position $P_2+X_2$ from the virtual cell front end position $P_2$ and the reference position $X_2$. The PID controller 50 calculates a difference $\Delta_2$ between the present position $P_2+Y_2$ of the vehicle found from the magnetic sensor 46 and pulse counter 47, and the target position $P_2+X_2$, and controls the actuators 48, 49 such that $\Delta_2$ is 0.

The third and subsequent following vehicles are controlled in the same way as the first and second following vehicles 31. The vehicle-mounted receiver 43 receives a virtual cell front end position $P_i$ from the immediately preceding vehicle (i is a vehicle number counted from the platoon leader as 0). The virtual cell setter 51 stores the virtual cell $L_i$ of the vehicle. The vehicle-mounted transmitter 52 sends $P_{i+1}=P_i+L_i$, to the immediately following vehicle as a virtual cell front end position of the immediately following vehicle. The target position setter 44 calculates a target position $P_i+X_i$ from the virtual cell front end position $P_i$ and the reference position $X_i$ stored in the reference position memory 53. The PID controller 50 calculates a difference $\Delta_i$ between the present position $P_i+Y_i$ of the vehicle found from the magnetic sensor 46 and pulse counter 47, and this target position $P_i+X_i$, and controls the actuators 48, 49 such that $\Delta_i$ is 0.

In order to detect the actual present position of the vehicle, a receiver of a Global Positioning System (GPS) may be used instead of the magnetic sensor 46 and pulse counter 47 on the road provided with magnetic nails 45. The GPS receiver may be a device used to obtain current position information in a car navigation system.

Figure 3:
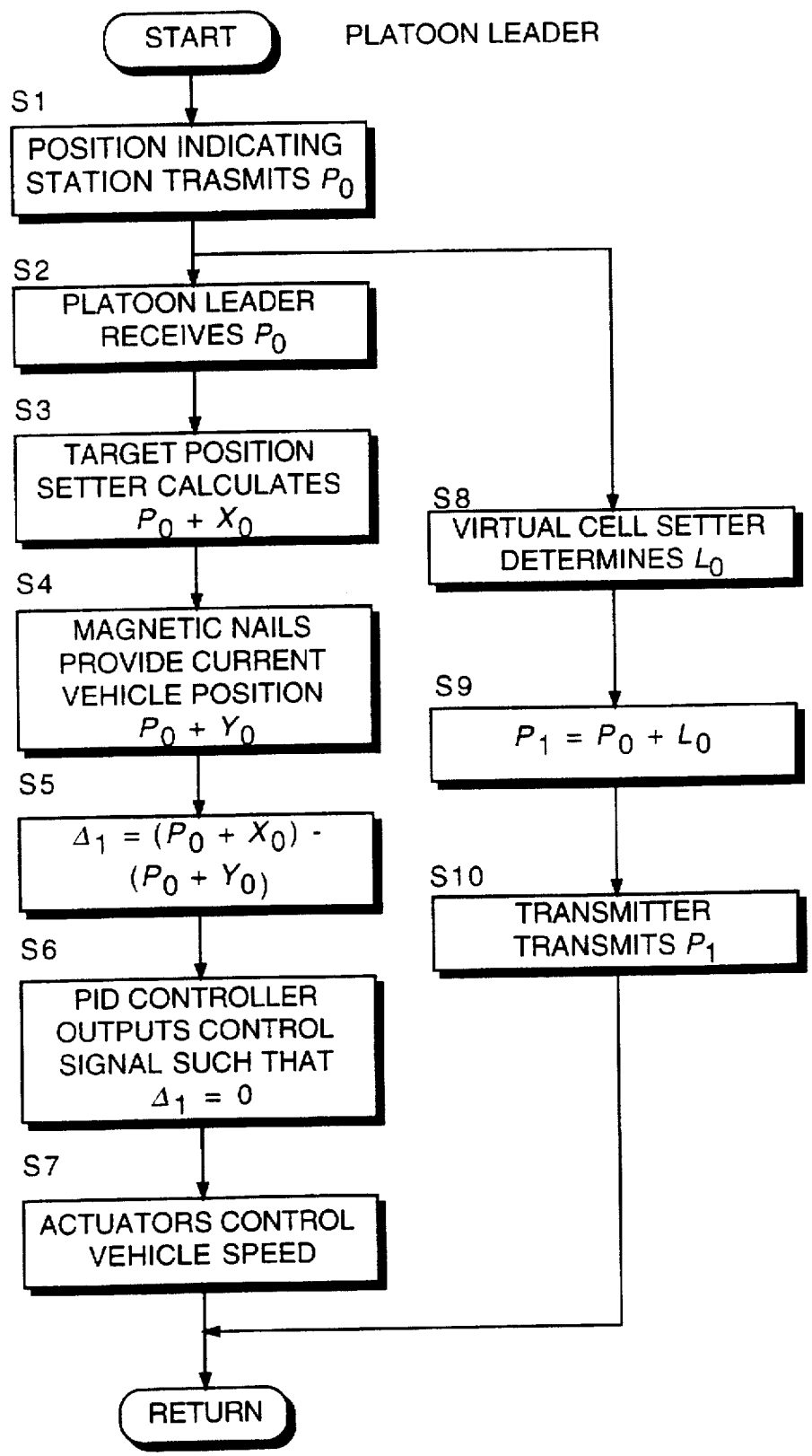
FIG. 3 is a flowchart describing a process for controlling the travel of a platoon leader executed by the controller.

The travel control process in the platoon leader 30 will now be described referring to the flowchart of FIG. 3.

In a step S1, the position indicating station 41 transmits the virtual cell front end position $P_0$ of the platoon leader, and in a step S2, the vehicle-mounted receiver 43 of the platoon leader receives this signal.

In a step S3, the target position setter 44 calculates the target position $P_0+X_0$ from the virtual cell front end position $P_0$ and reference position $X_0$ stored in the reference position memory 53.

In a step S4, the magnetic sensor 46 detects magnetic pulses from the magnetic nails 5, and the pulse counter 47 integrates the magnetic pulses so as to obtain the actual present position $P_0+Y_0$ of the vehicle.

In a step S5, the PID controller 50 calculates the difference $\Delta_0$ between the target position $P_0+X_0$ and the present position $P_0+Y_0$.

In a step S6, the PID controller 50 outputs a control signal to the actuators 48, 49 such that $\Delta_0=0$.

In a step S7, the actuators 48, 49 adjust the engine throttle opening and brake according to the control signal.

At the same time as the aforesaid control procedure, in steps S8–S10 following the step S2, the vehicle-mounted transmitter 52 transmits the virtual cell front end position $P_1=P_0+L_0$ of the first following vehicle 31 to the first following vehicle 31.

Figure 4:
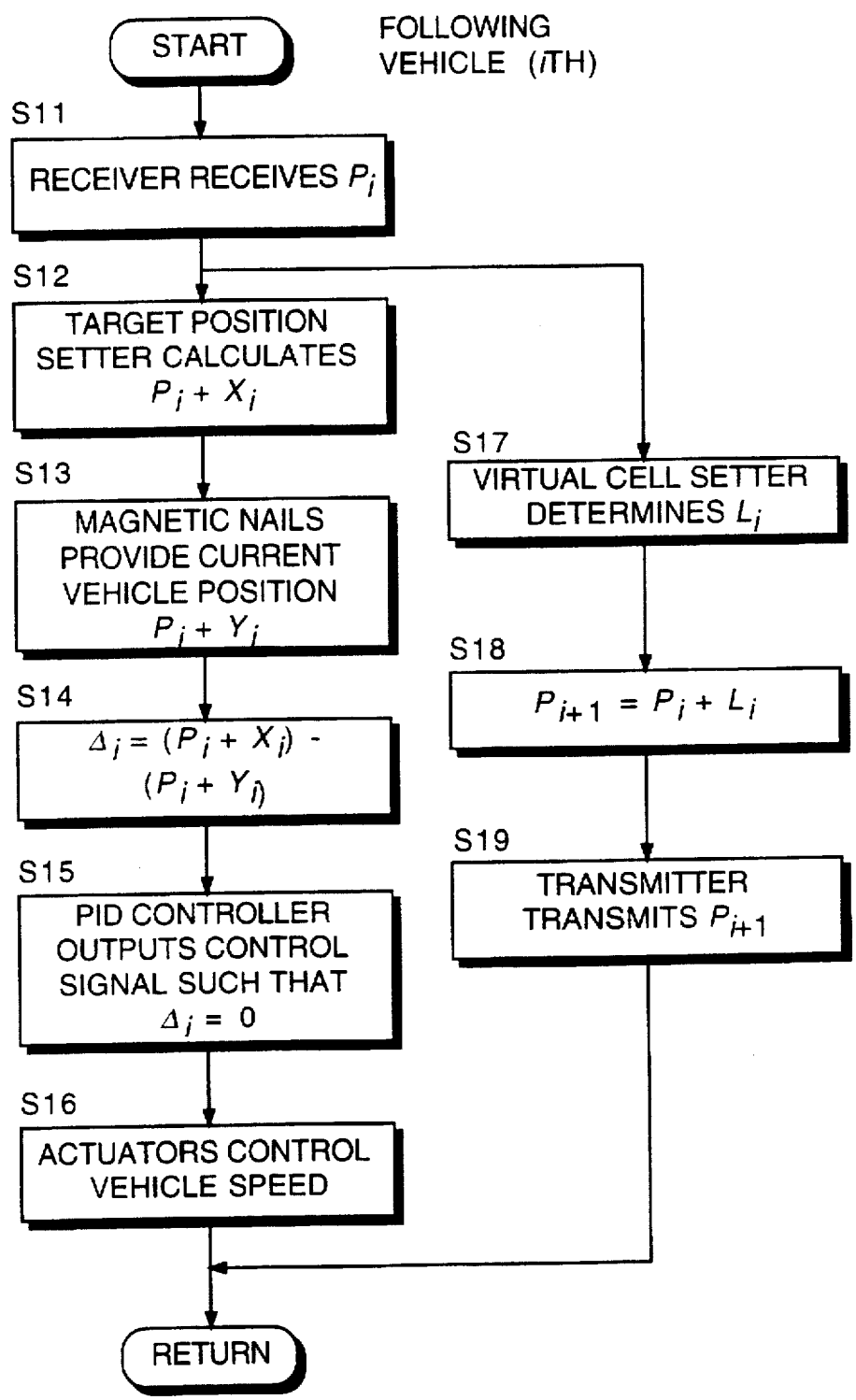
FIG. 4 is a flowchart describing a process for controlling the travel of a following vehicle executed by the controller.

Next, the travel control process in one of the following vehicles 31 will be described using the flowchart of FIG. 4. First, in a step S11, the virtual cell front end position $P_i=P_{i-1}+L_{i-1}$ of the vehicle #i is received from the immediately preceding vehicle #i–1 in the group.

In a step S12, the target position setter 44 calculates the target position $P_i+X_i$ from this virtual cell front end position $P_i$ and the reference position $X_i$ stored in the reference position memory 53.

In a step S13, the magnetic sensor 46 detects magnetic pulses from the magnetic nails 5, and the pulse counter 47 integrates the magnetic pulses so as to obtain the actual present position $P_i+Y_i$ of the vehicle.

In a step S14, the PID controller 50 calculates the difference $\Delta_1$ between the target position $P_i+X_i$ and the present position $P_i+Y_i$.

In a step S15, the PID controller 50 outputs a control signal to the actuators 48, 49 such that $\Delta_i=0$.

In a step S16, the actuators 48, 49 adjust the engine throttle opening and brake according to the control signal.

At the same time as the aforesaid control procedure, in steps S17–S19 following the step S2, the vehicle-mounted transmitter 52 transmits the virtual cell front end position $P_{i+1}=P_i+L_i$ of the following vehicle #i+1 to the vehicle #i+1.

Figure 23A:
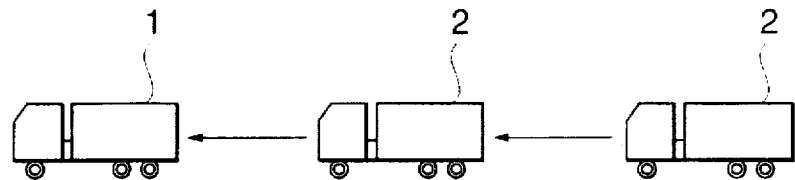
FIGS. 23A–23D are diagrams describing various prior art control systems.
Figure 23B:
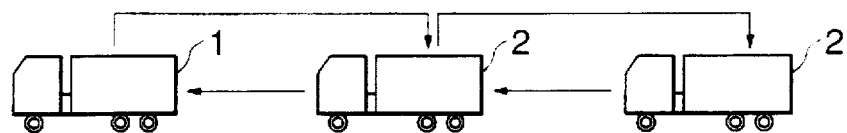
Figure 23C:
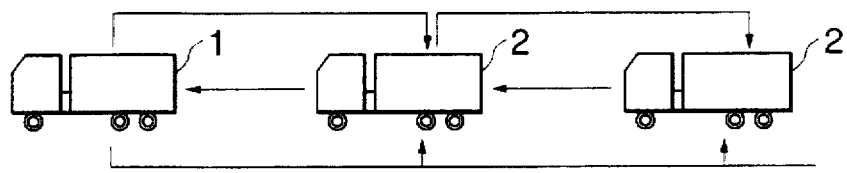
Figure 23D:
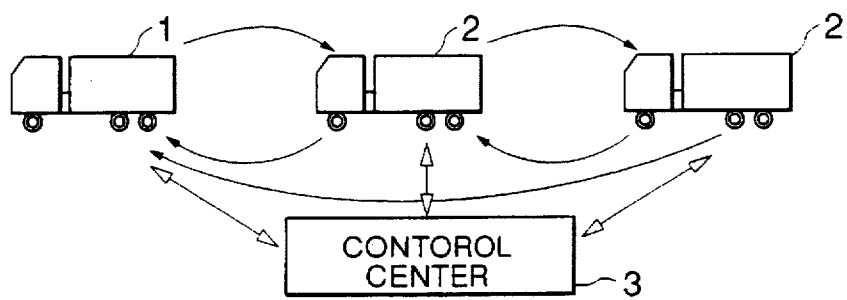

In this way, the target position and present position of each vehicle are specified as relative positions in a virtual cell, and the travel speed is controlled such that the present position coincides with the target position for each vehicle. As a result, when the virtual cell front end position $P_0$ of the platoon leader 30 moves, the virtual cell front end position $P_i$ of each of the following vehicles moves and each of the following vehicles moves together with its virtual cell. As shown by the aforesaid flowcharts, the virtual cell front end position is transmitted separately from the control process, and can therefore be transmitted rapidly without being affected by the time required to perform the control. Further, as the relative position of a vehicle in the virtual cell is controlled, the speed of the vehicle is unaffected by travel speed variations of the vehicles in front as in the case of the aforesaid conventional systems shown in FIGS. 23A, 23B wherein the distance to the vehicle in front is measured by a sensor. Consequently, dilatational waves between the vehicles are suppressed even when the group comprises a large number of vehicles, and the inter-vehicle distance may be set small. Still further, as the position of each vehicle can be controlled only by communication between the platoon leader 30 and the position indicating station 41, and by communication between preceding and following vehicles, design of the control system is easier than in the case of the aforesaid prior art systems shown in FIGS. 23C, 23D.

Figure 5:
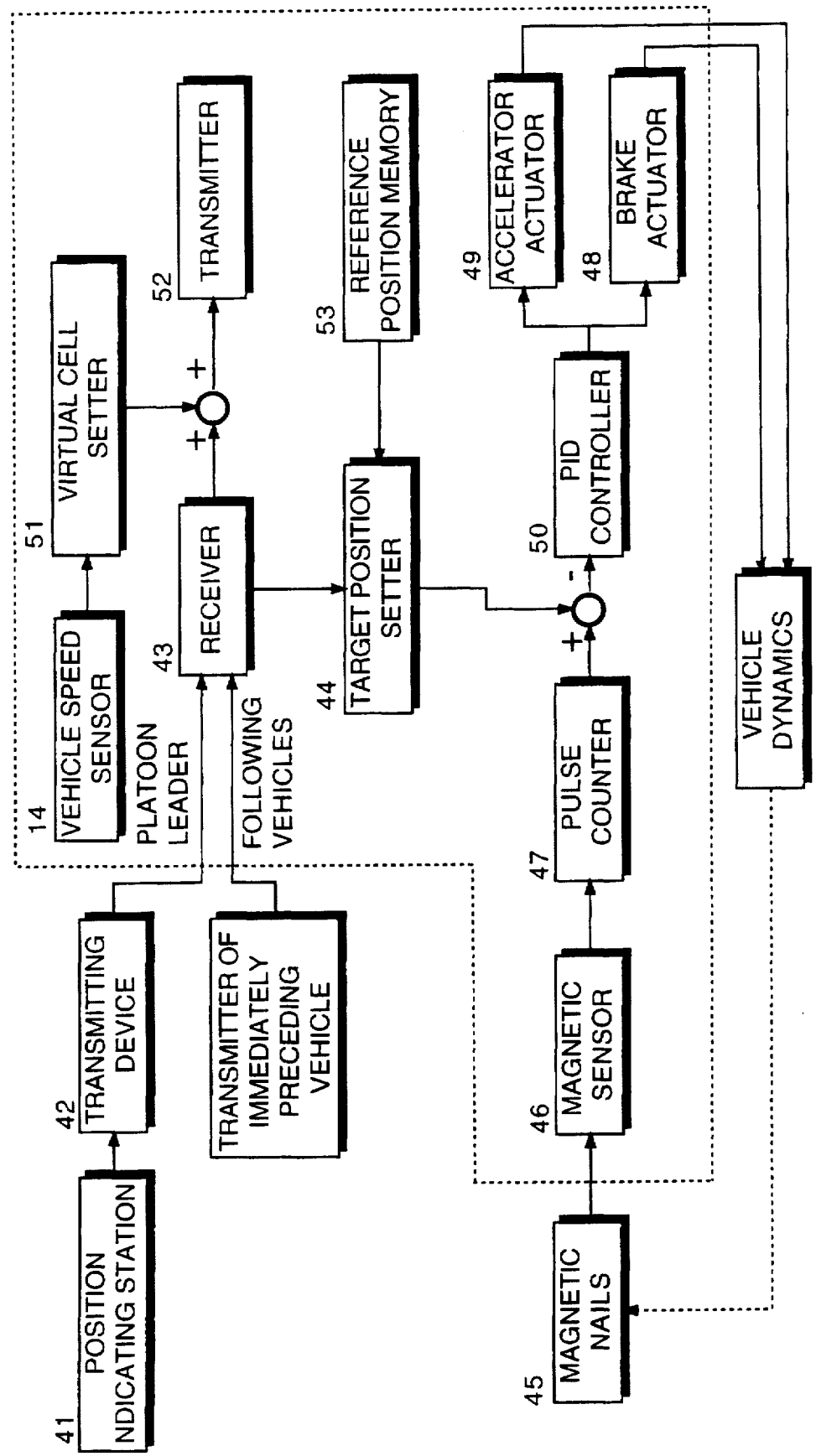
FIG. 5 is similar to FIG. 2, but showing a second embodiment of this invention.
Figure 6:
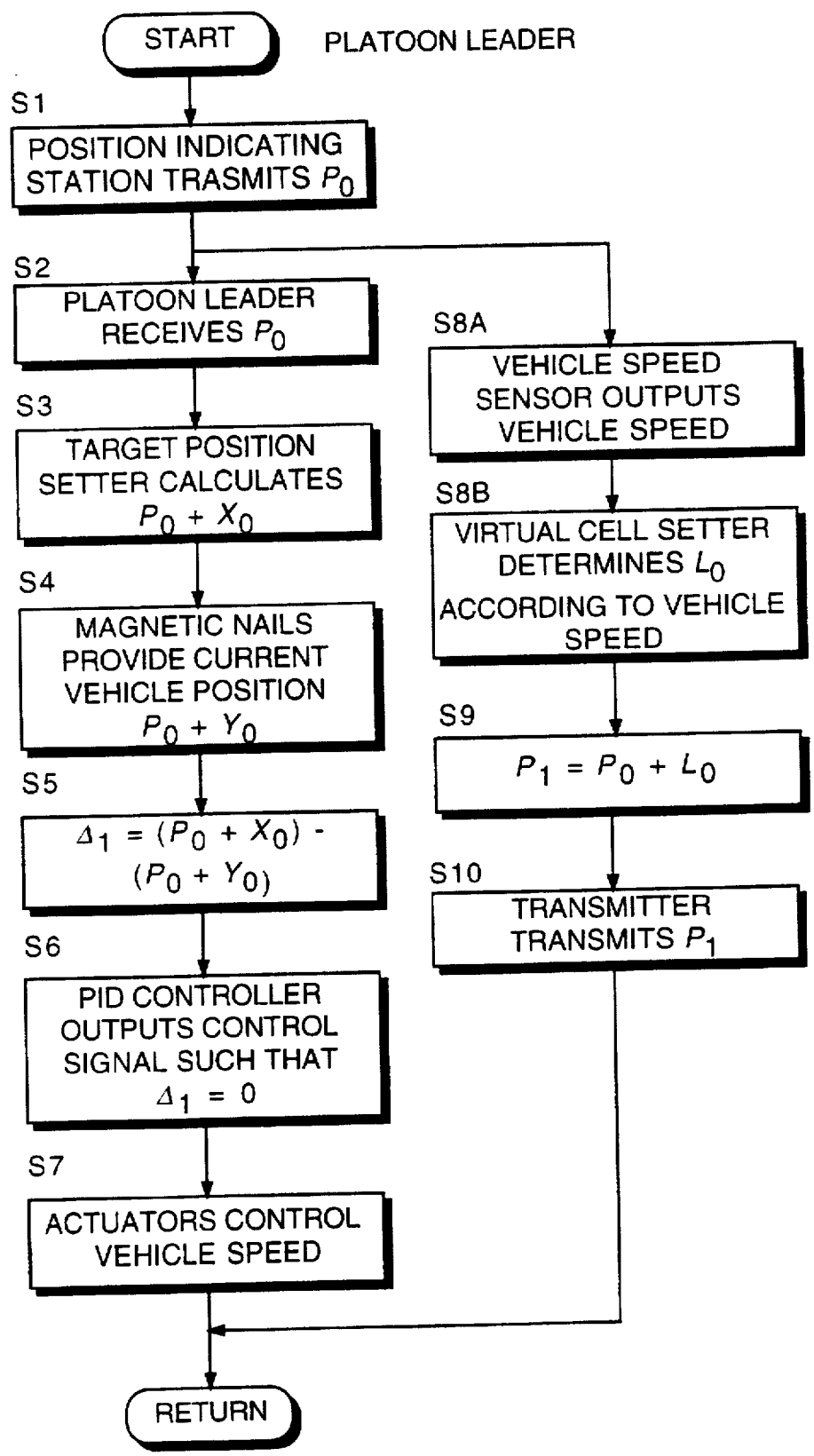
FIG. 6 is a flowchart describing a process for controlling the travel of the platoon leader according to the second embodiment.
Figure 7:
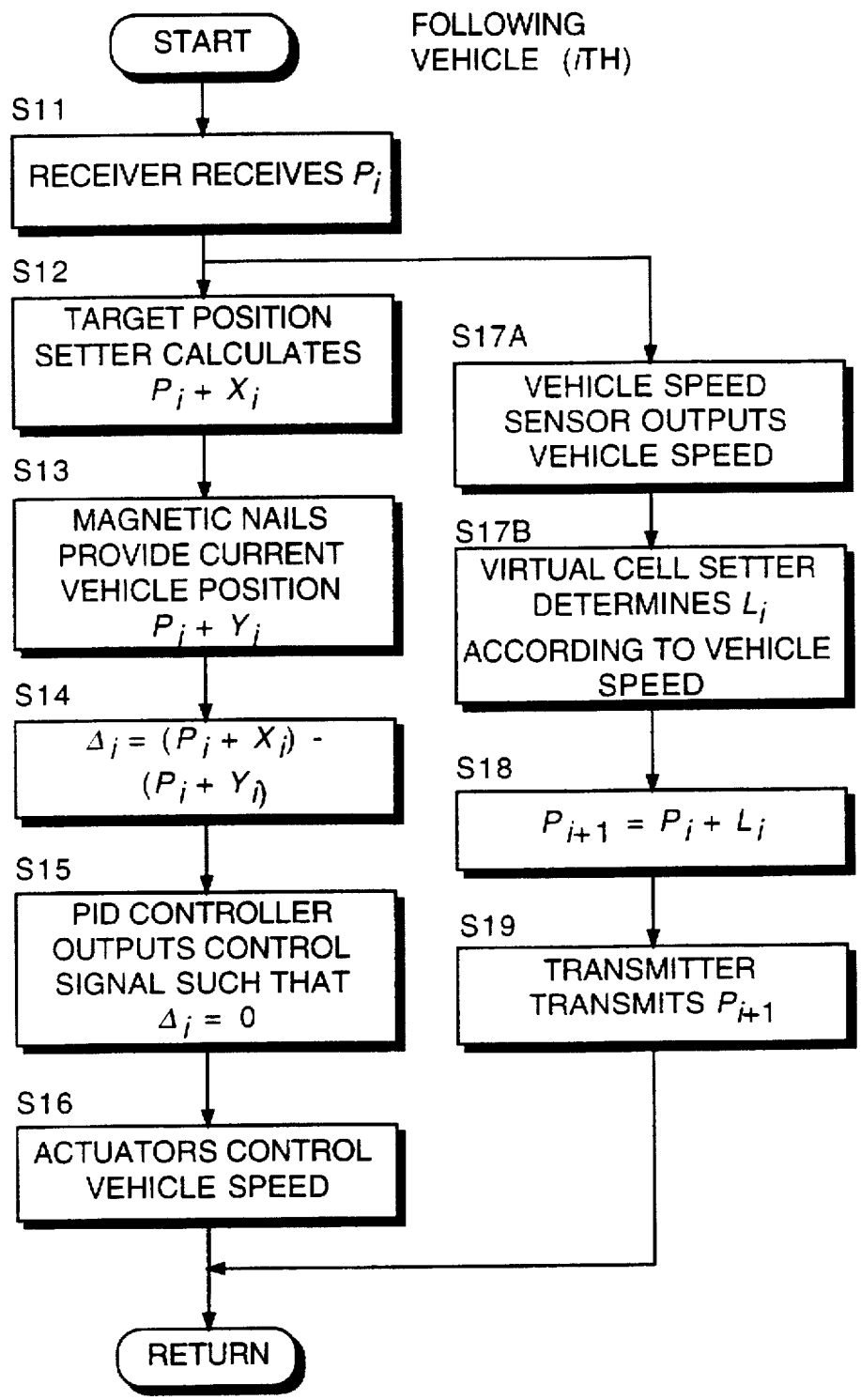
FIG. 7 is a flowchart describing a process for controlling the travel of the following vehicle according to the second embodiment.

FIGS. 5–7 show a second embodiment of this invention.

According to this embodiment, the length of a virtual cell is varied according to the speed of a vehicle. The virtual cell of each vehicle is appropriately set from the overall length of the vehicle body and performance of the vehicle, but the braking distance varies according to changes in its motion characteristics. If the braking distance is $S[m]$, "dead" time from when a braking command is issued until braking actually starts is $t_0[s]$, braking initial speed is $v_0[m/s]$ and deceleration is $$\alpha[m/s^2], S = t_0 \cdot v_0 + \frac{V_0^2}{2 \cdot \alpha}.$$

Herein, the deceleration a may be expressed by $$\alpha = \frac{Fb}{W} - g \cdot \sin\theta$$

where the braking force is $Fb[N]$, overall vehicle weight is $W[kg]$, the acceleration due to gravity is $g[m/s^2]$ and the inclination of the road surface is $\theta[rad]$. Also, the braking force Fb may be expressed by $Fb=\mu b.wi$ where the load on each vehicle wheel is $wi[kg]$, and the frictional coefficient between a tire and the road surface is $\mu b$. From these relationships, the braking distance may be rewritten as the following equation (1):

$$S = t_0 \cdot v_0 + \frac{1}{2} \cdot \frac{v_0^2 \cdot w}{\mu b \cdot wi - W \cdot g \cdot \sin\theta} \quad (1)$$

It is seen from this equation that the initial braking speed $v_0$ has a large influence on the braking distance. According to this embodiment therefore, each vehicle is provided with a vehicle speed sensor 14 for detecting the speed of the vehicle as shown by FIG. 5. Hence, as shown by steps 8A, 8B and steps 17A, 17B in the flowcharts of FIGS. 6 and 7, when the platoon leader 30 receives a command signal from the position indicating station 41, the virtual cell setter 51 corrects the virtual cell set value $L_0$ or $L_i$ to a larger value the higher the vehicle speed, for each vehicle.

The position indicating station 41 may vary the amount of motion of the virtual cell front end position $P_0$ in unit time given to the platoon leader 30, i.e. the vehicle group speed of motion, according to the type of road, e.g. expressway or ordinary road. If the length of the virtual cell of each vehicle is varied according to the vehicle speed as in this embodiment, an optimum inter-vehicle distance is always maintained corresponding to the vehicle group speed.

Figure 8:
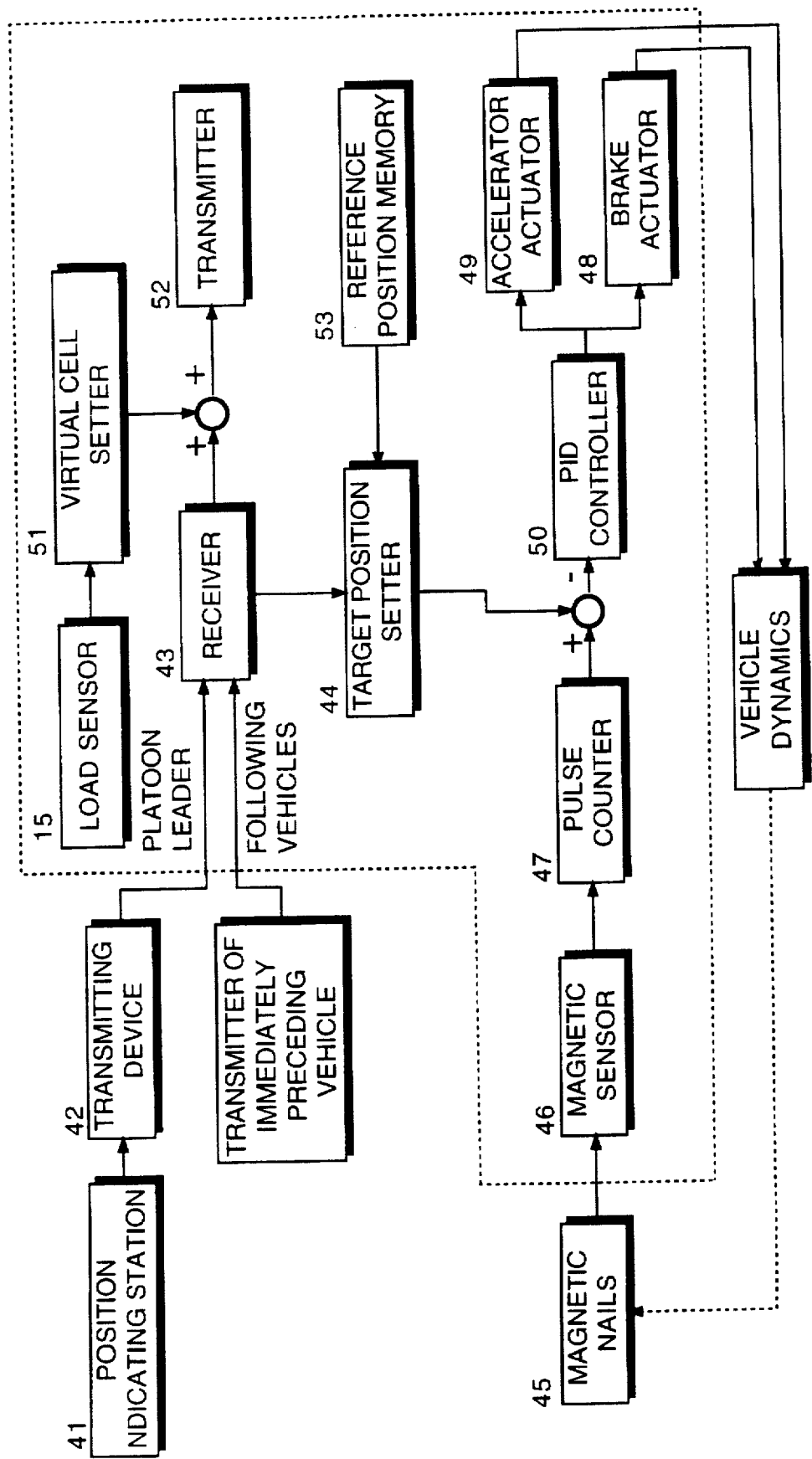
FIG. 8 is similar to FIG. 2, but showing a third embodiment of this invention.
Figure 9:
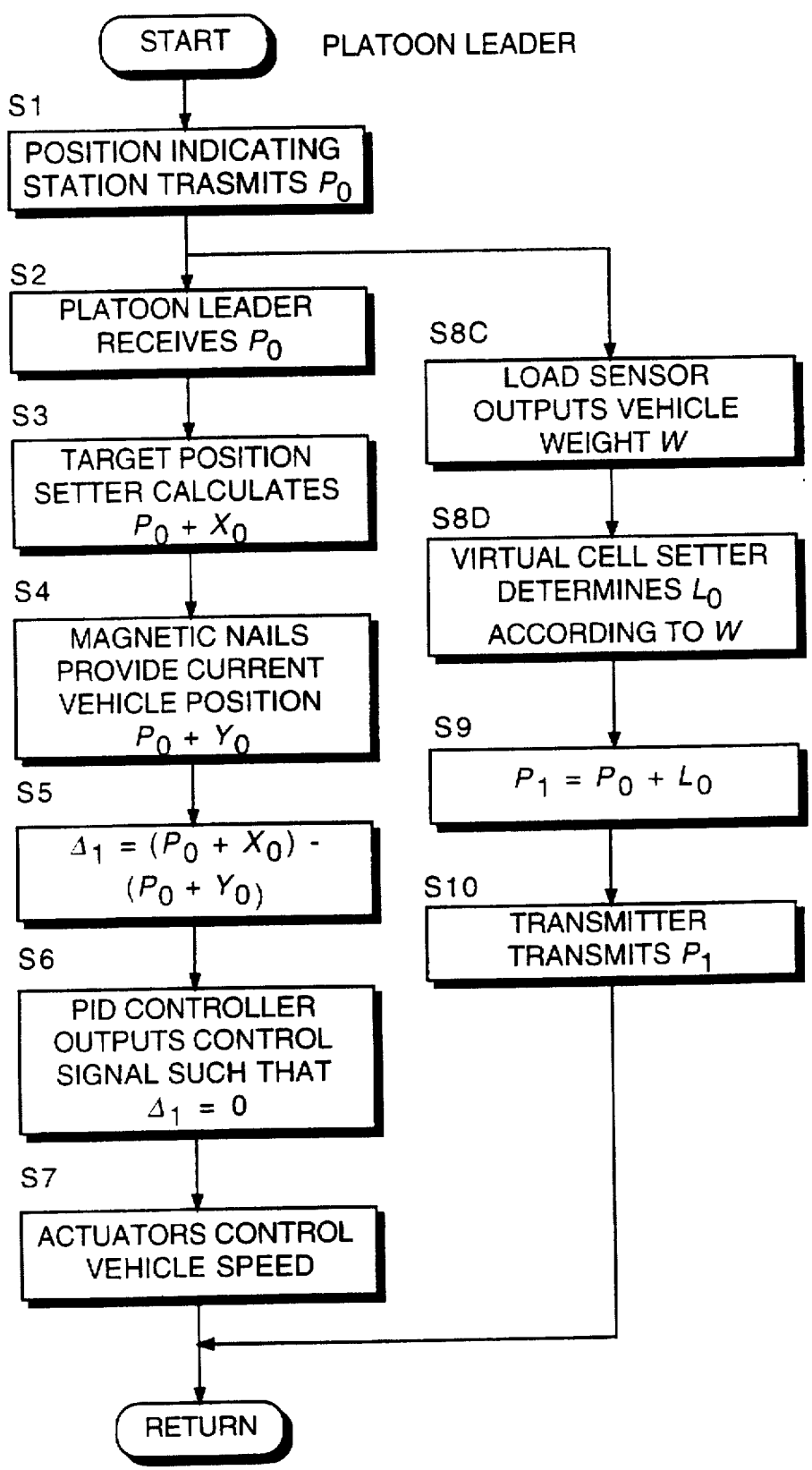
FIG. 9 is a flowchart describing a process for controlling the travel of the platoon leader according to the third embodiment.
Figure 10:
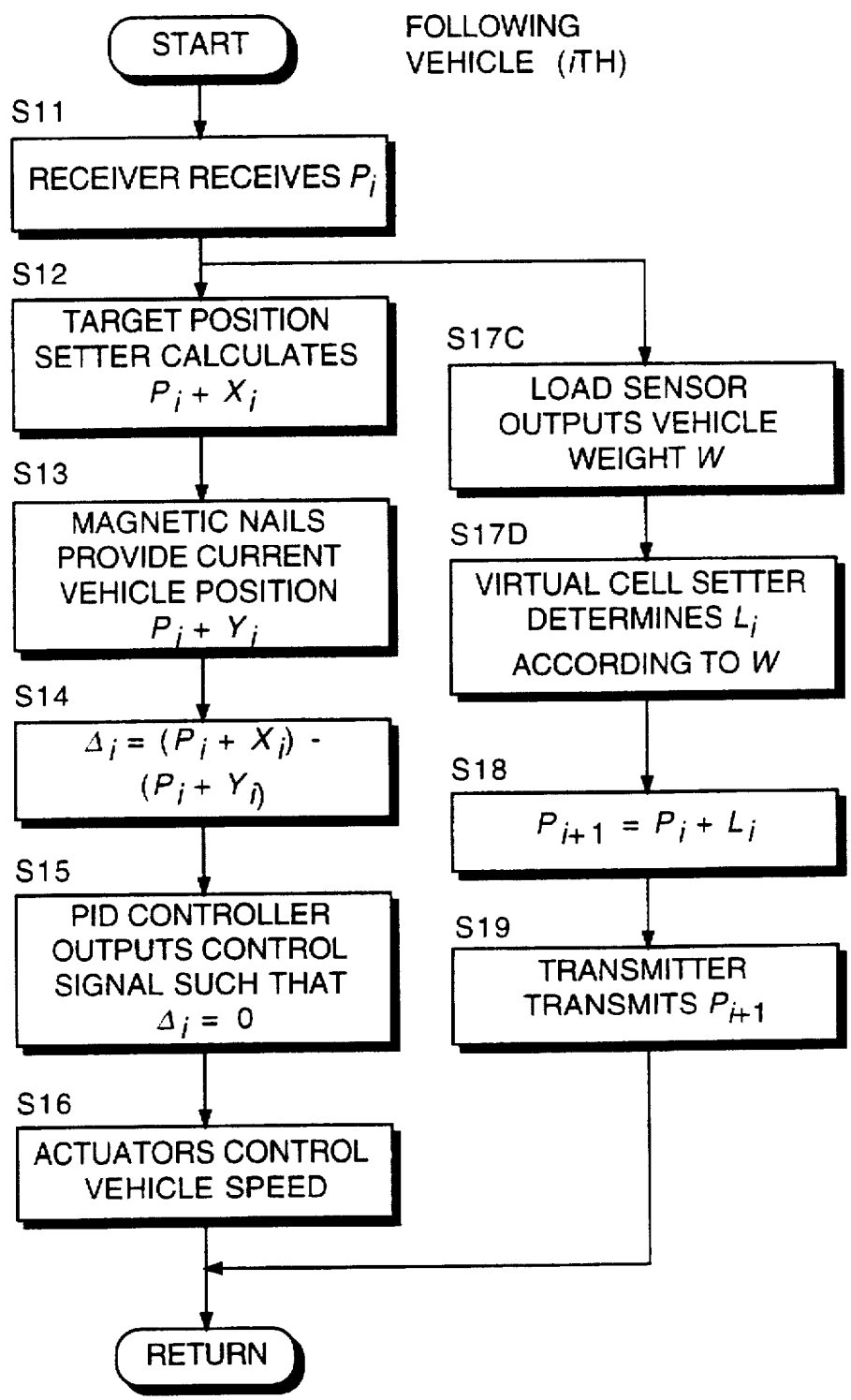
FIG. 10 is a flowchart describing a process for controlling the travel of the following vehicle according to the third embodiment.

FIGS. 8–10 shows a third embodiment of this invention.

According to this embodiment, each vehicle comprises a load sensor 15 for detecting the overall vehicle weight W as shown in FIG. 8. Hence, as shown by steps 8C, 8D and steps 17C, 17D in the flowcharts of FIGS. 9 and 10, when the platoon leader 30 receives a command signal from the position indicating station 41, the virtual cell setter 51 corrects the virtual cell set value $L_0$ or $L_i$ to a length depending on the overall weight W of the vehicle, for each vehicle.

In the case of commercial vehicles such as trucks, the overall weight W of the vehicle largely varies according to whether the vehicle is full or empty. If the length of the virtual cell if each vehicle is corrected to be large when the vehicle is full and small when the vehicle is empty, an optimum inter-vehicle distance is always maintained corresponding to the overall vehicle weight.

Figure 11:
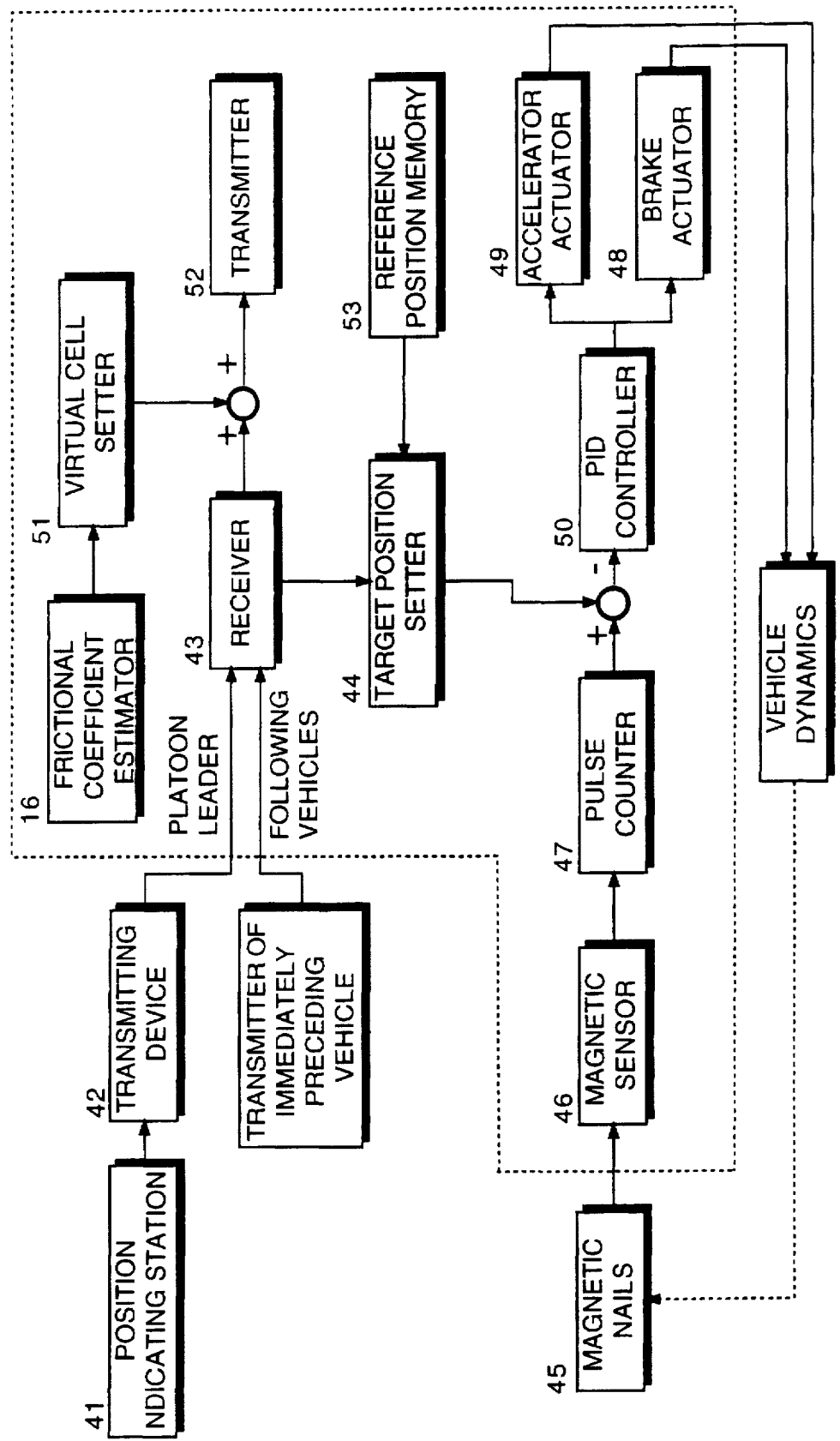
FIG. 11 is similar to FIG. 2, but showing a fourth embodiment of this invention.
Figure 12:
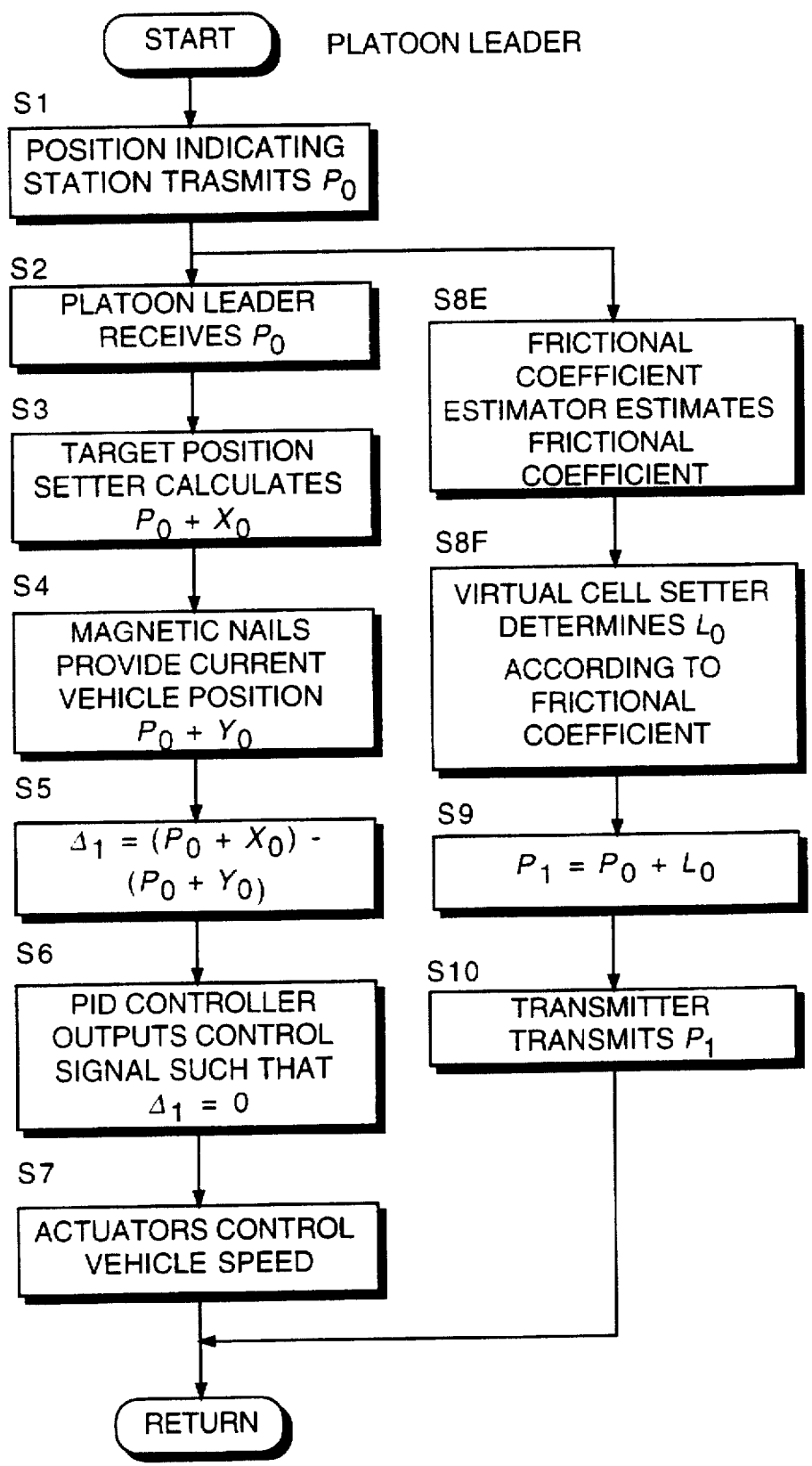
FIG. 12 is a flowchart describing a process for controlling the travel of the platoon leader according to the fourth embodiment.
Figure 13:
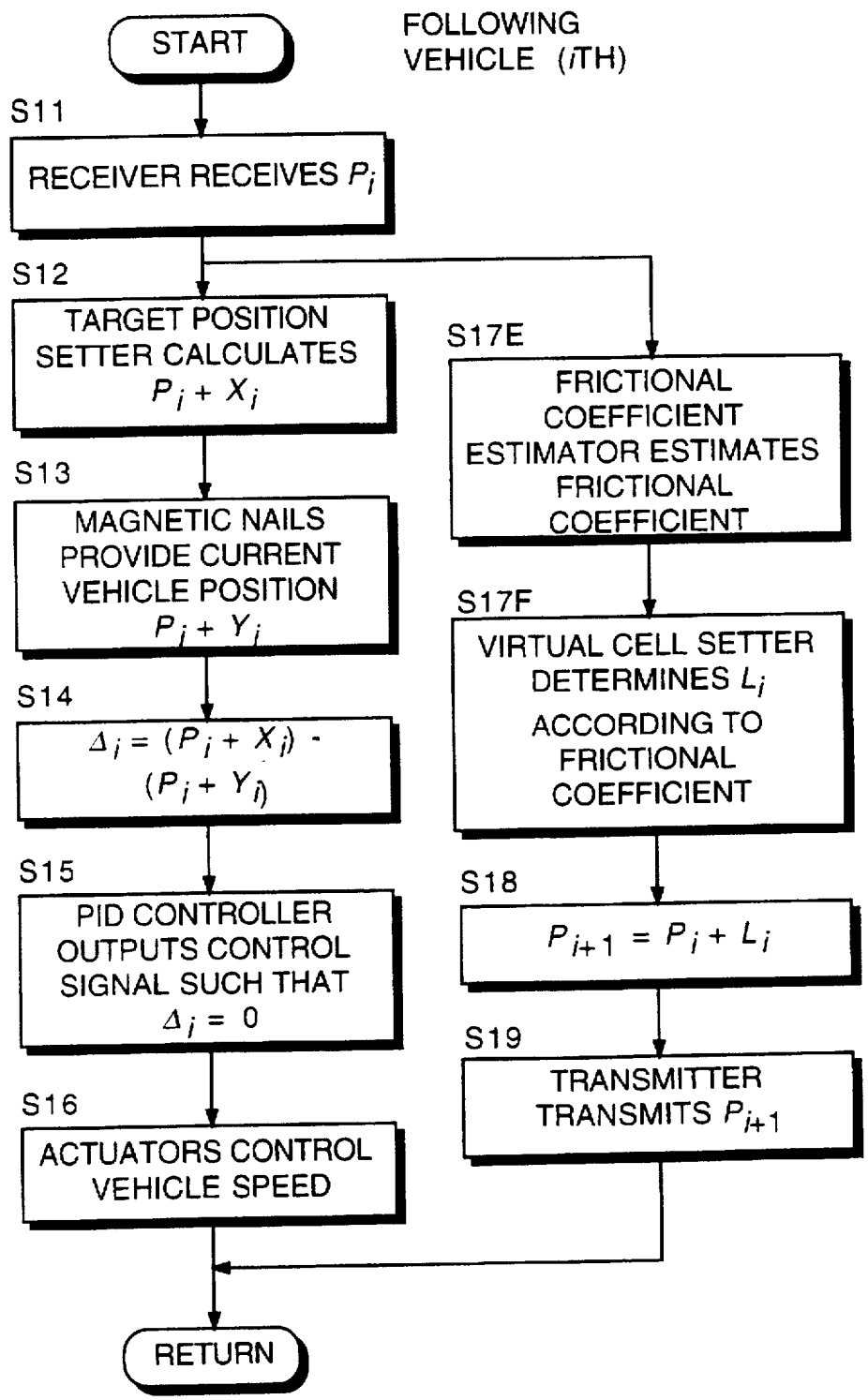
FIG. 13 is a flowchart describing a process for controlling the travel of the following vehicle according to the fourth embodiment.

FIGS. 11–13 show a fourth embodiment of this invention.

According to this embodiment, each vehicle is provided with a frictional coefficient estimator 16 which estimates the frictional coefficient between the tires and the road surface. Hence, as shown by steps 8E, 8F and steps 17E, 17F in the flowcharts of FIGS. 12 and 13, when the platoon leader 30 receives a command signal from the position indicating station 41, the virtual cell setter 51 corrects the virtual cell set value $L_0$ or $L_i$ to a larger value the smaller the frictional coefficient for each vehicle.

The frictional coefficient estimator 16 is described for example in the following publications:

"ENVIRONMENT RECOGNITION TECHNIQUES AND APPLICATION TO CHASSIS CONTROL", Mitsubishi Motors Technical Review 1993, No. 5

"PERFORMANCE OF M-ABS FITTED VEHICLES WITH ROAD SURFACE FRICTION ABS CONTROL SYSTEMS", Automobile Technology Association, Technical Lectures, Part 1, 953, 1995-5

According to this embodiment, an optimum inter-vehicle distance is maintained even when the frictional coefficient between the tires and the road surface varies due for example to climatic changes.

Figure 14:
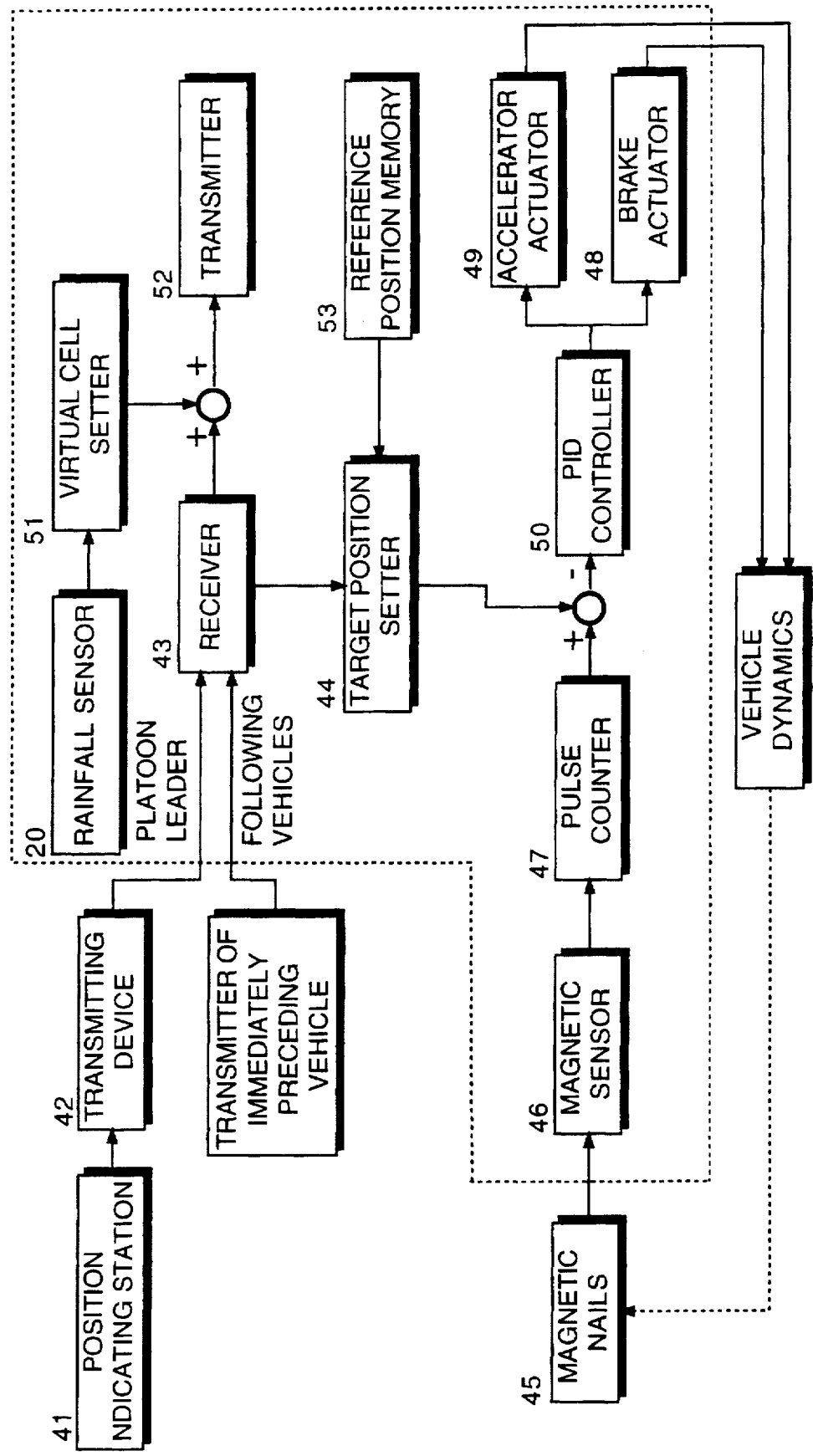
FIG. 14 is similar to FIG. 2, but showing a fifth embodiment of this invention.
Figure 15:
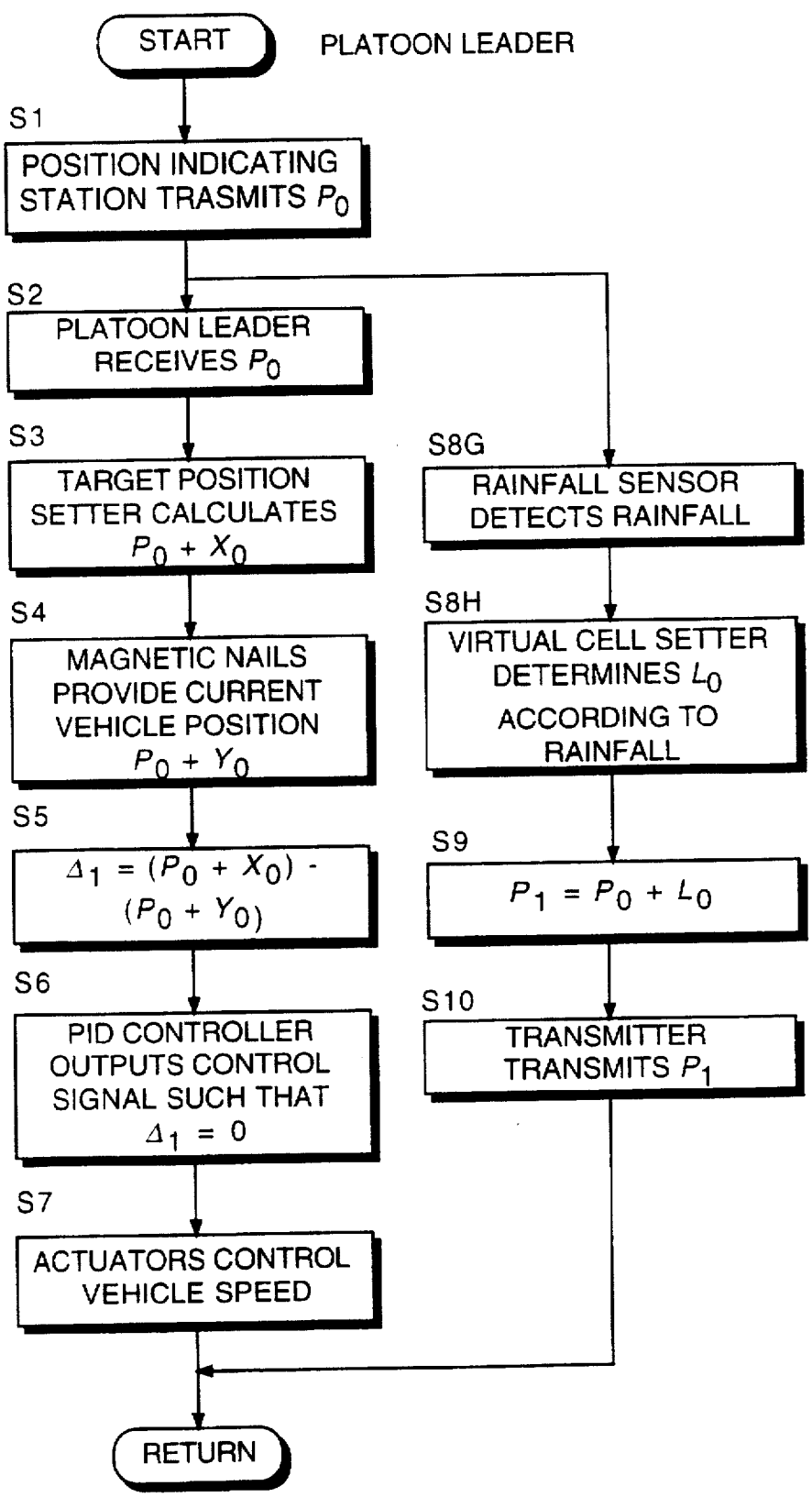
FIG. 15 is a flowchart describing a process for controlling the travel of the platoon leader according to the fifth embodiment.
Figure 16:
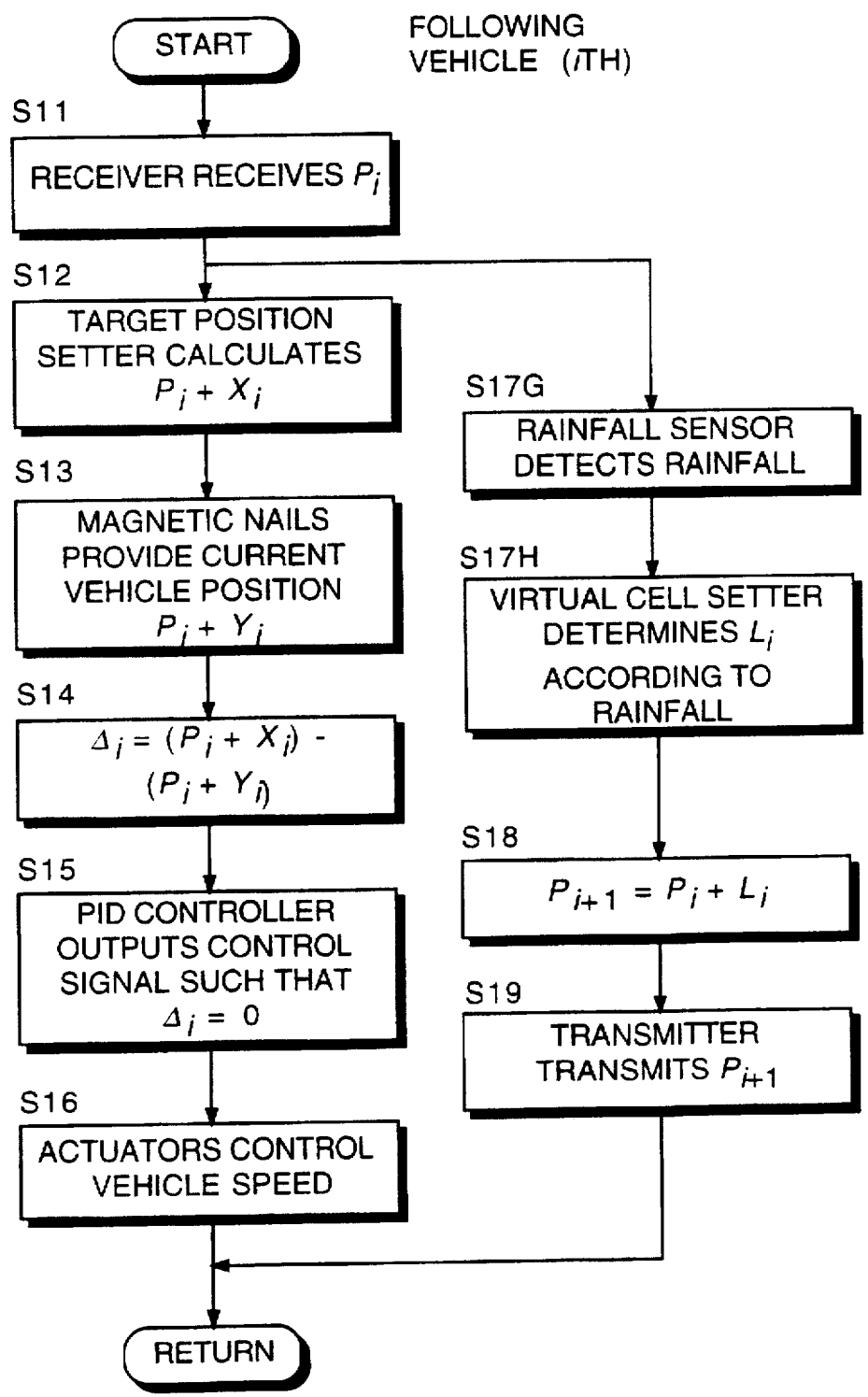
FIG. 16 is a flowchart describing a process for controlling the travel of the following vehicle according to the fifth embodiment.

FIGS. 14–16 show a fifth embodiment of this invention.

According to this embodiment, a rain sensor 20 which detects raindrops is provided instead of the frictional coefficient estimator 16 of the fourth embodiment. Hence, as shown by steps 8G, 8H and steps 17G, 17H in the flowcharts of FIGS. 15 and 16, when the platoon leader 30 receives a command signal from the position indicating station 41, the rain sensor 20 on each vehicle determines whether or not it is raining, and the virtual cell setter 51 corrects the virtual cell set value $L_0$ or $L_i$ to a larger value when it is raining.

According to this embodiment, an optimum inter-vehicle distance is maintained in rainy weather.

Figure 17:
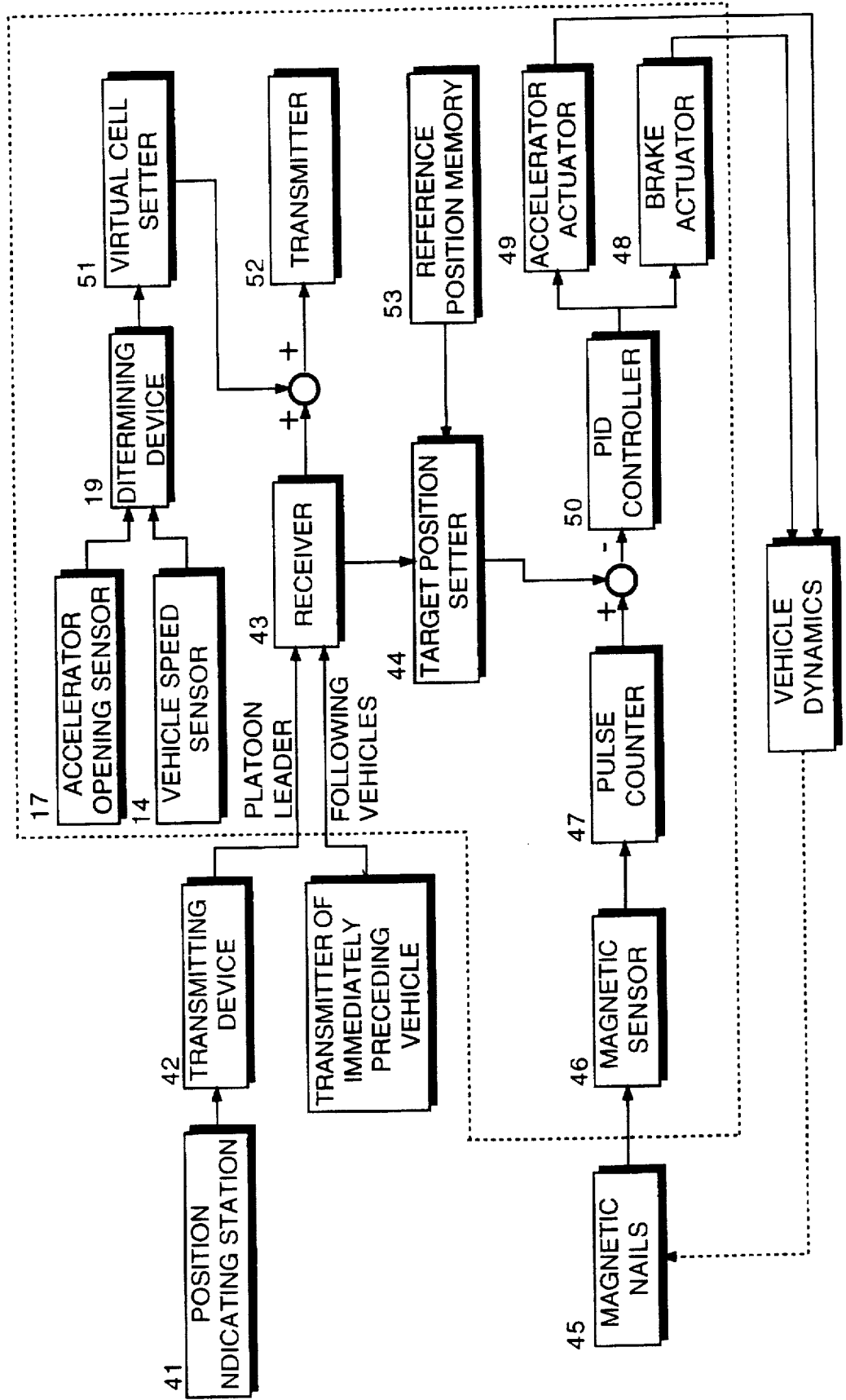
FIG. 17 is similar to FIG. 2, but showing a sixth embodiment.
Figure 18:
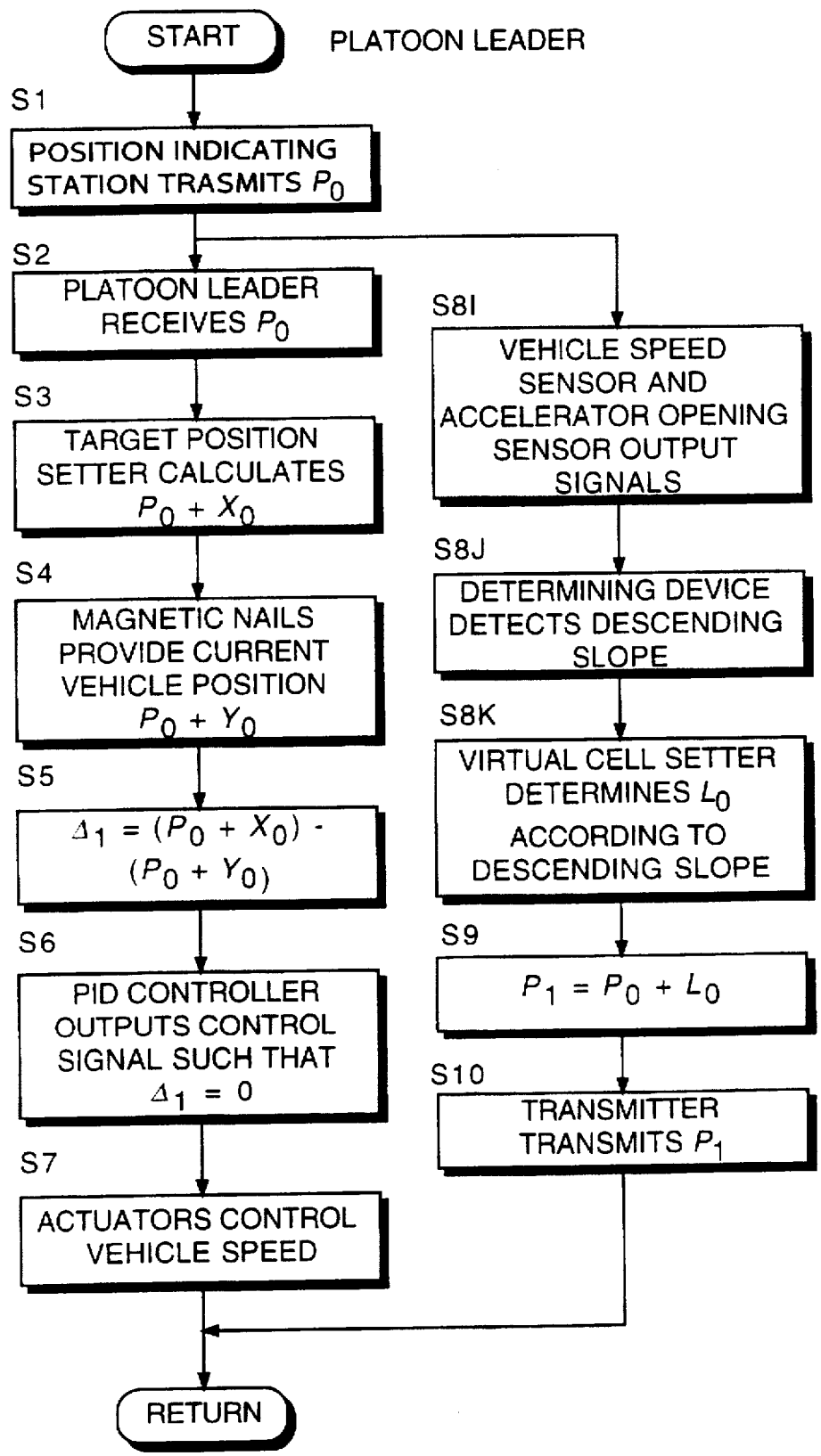
FIG. 18 is a flowchart describing a process for controlling the travel of the platoon leader according to the sixth embodiment.
Figure 19:
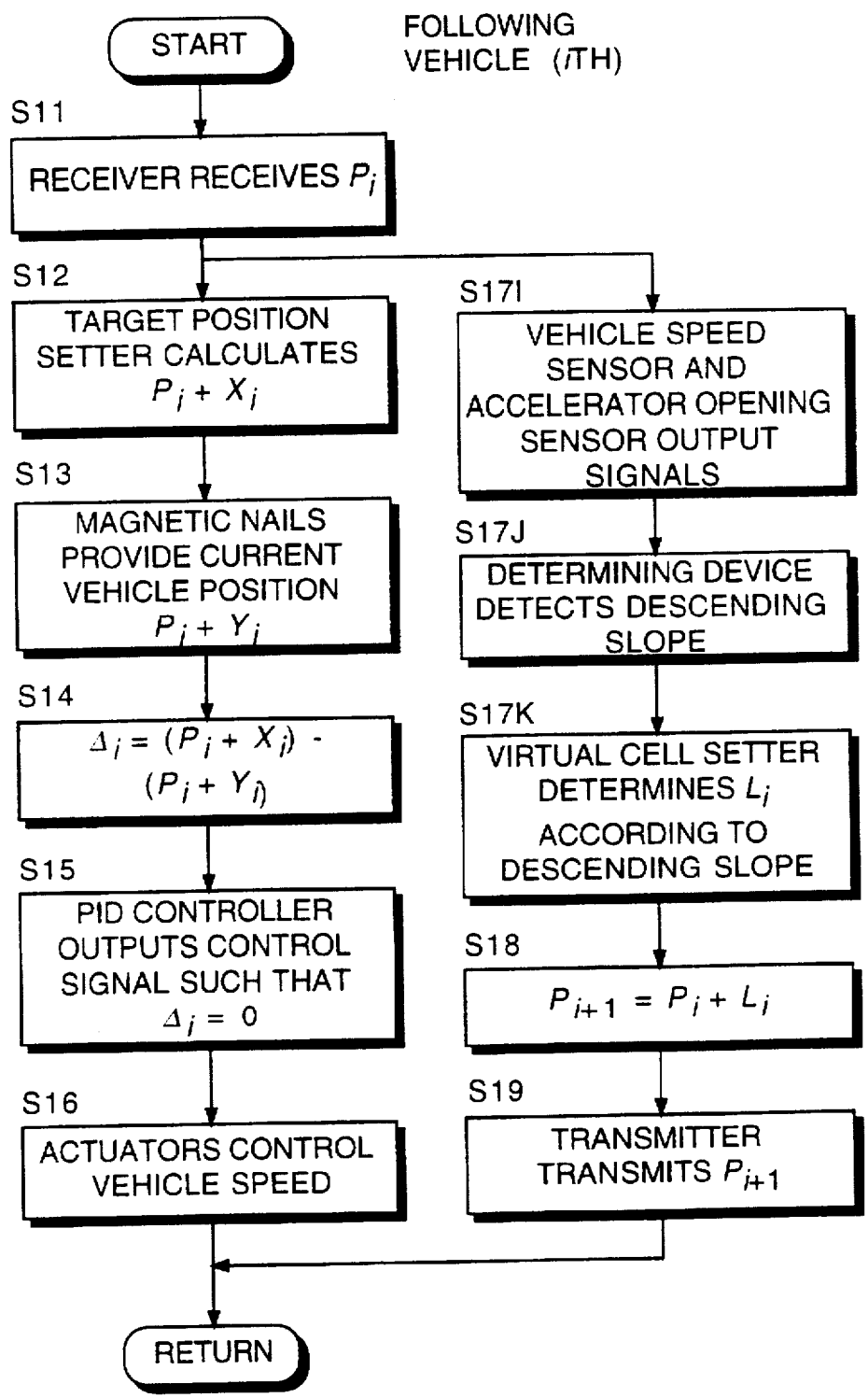
FIG. 19 is a flowchart describing a process for controlling the travel of the following vehicle according to the sixth embodiment.

FIGS. 17–19 show a sixth embodiment of this invention.

According to this embodiment, each vehicle is provided with a throttle opening sensor 17 which detects the engine throttle opening, the vehicle speed sensor 14 which detects the vehicle speed, and a determining device 19 which determines whether or not the vehicle group is descending a slope from these detected values. Hence, as shown by steps 8I–8K and steps 17I–17K in the flowcharts of FIGS. 18 and 19, when the platoon leader 30 receives a command signal from the position indicating station 41, the determining device 19 determines whether or not the vehicle is traveling down a slope from the throttle opening and vehicle speed for each vehicle, and the virtual cell setter 51 corrects the virtual cell set value $L_0$ or $L_i$ to a larger value on a descending slope.

Each vehicle may also be provided with a slope sensor which detects the gradient of the road surface, the virtual cell setter 51 correcting the length of the virtual cell to a smaller value when the vehicle is traveling on an ascending slope and to a larger value when the vehicle is traveling on a descending slope, according to the detected value of the slope sensor.

On a descending slope the braking distance is longer, however by correcting the length of the virtual cell to a larger value on a descent in this way, an optimum inter-vehicle distance corresponding to the increase of braking distance is maintained.

Each of the aforesaid second to sixth embodiments has the effect of increasing the safety of the group of vehicles even when applied alone. It is however desirable to combine them to calculate the required braking distance for each vehicle from the aforesaid equation (1), and correct the set value of the virtual cell accordingly.

In addition to the aforesaid embodiments, if each vehicle is provided with an adjusting device which arbitrarily varies the set value of the virtual cell, and a virtual cell setting means corrects the length of the virtual cell according to an adjustment value of the adjusting device, non-specific variations of conditions which may have an effect on the braking distance can be compensated as desired.

Figure 20:
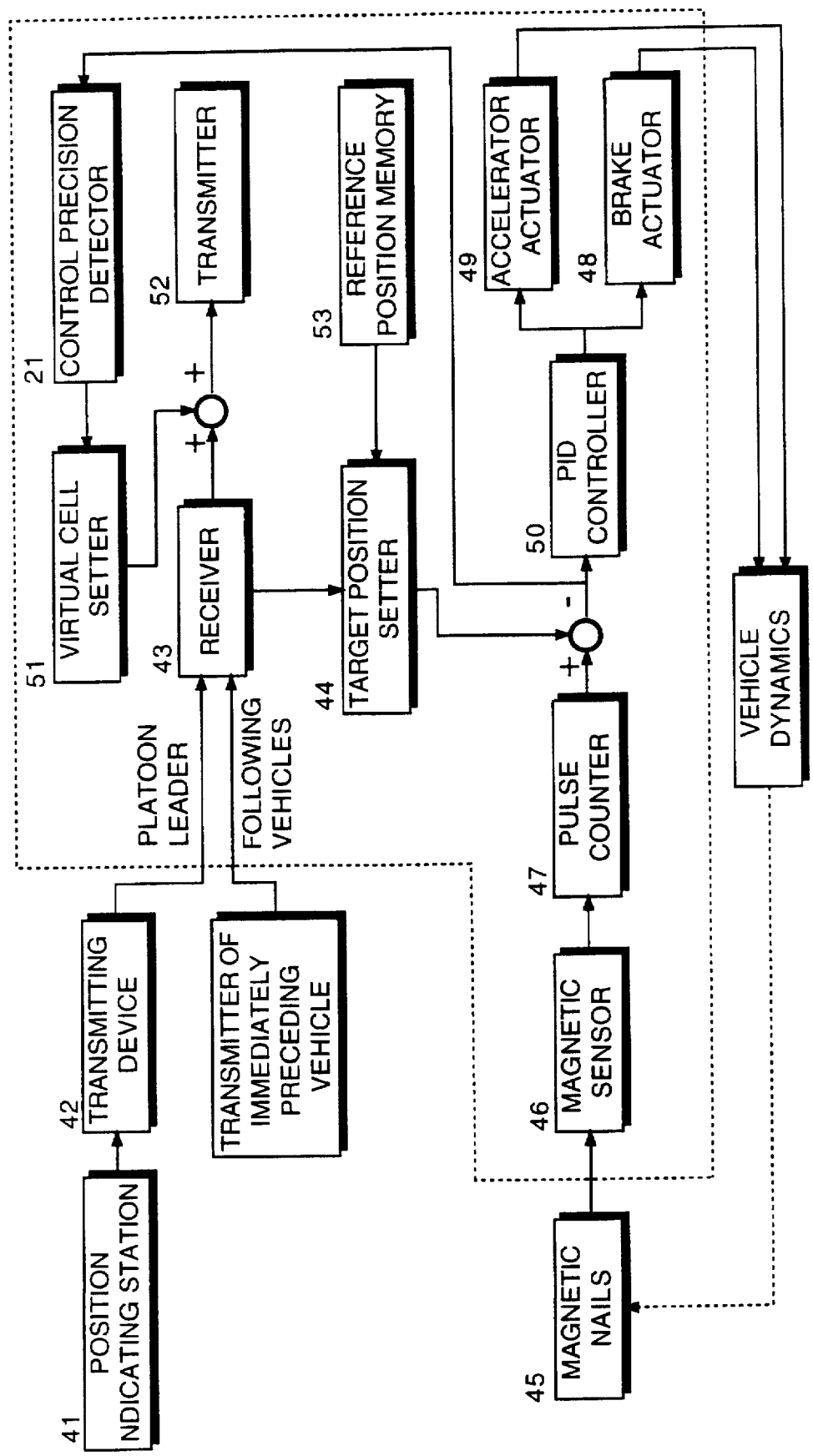
FIG. 20 is similar to FIG. 2, but showing a seventh embodiment of this invention.
Figure 21:
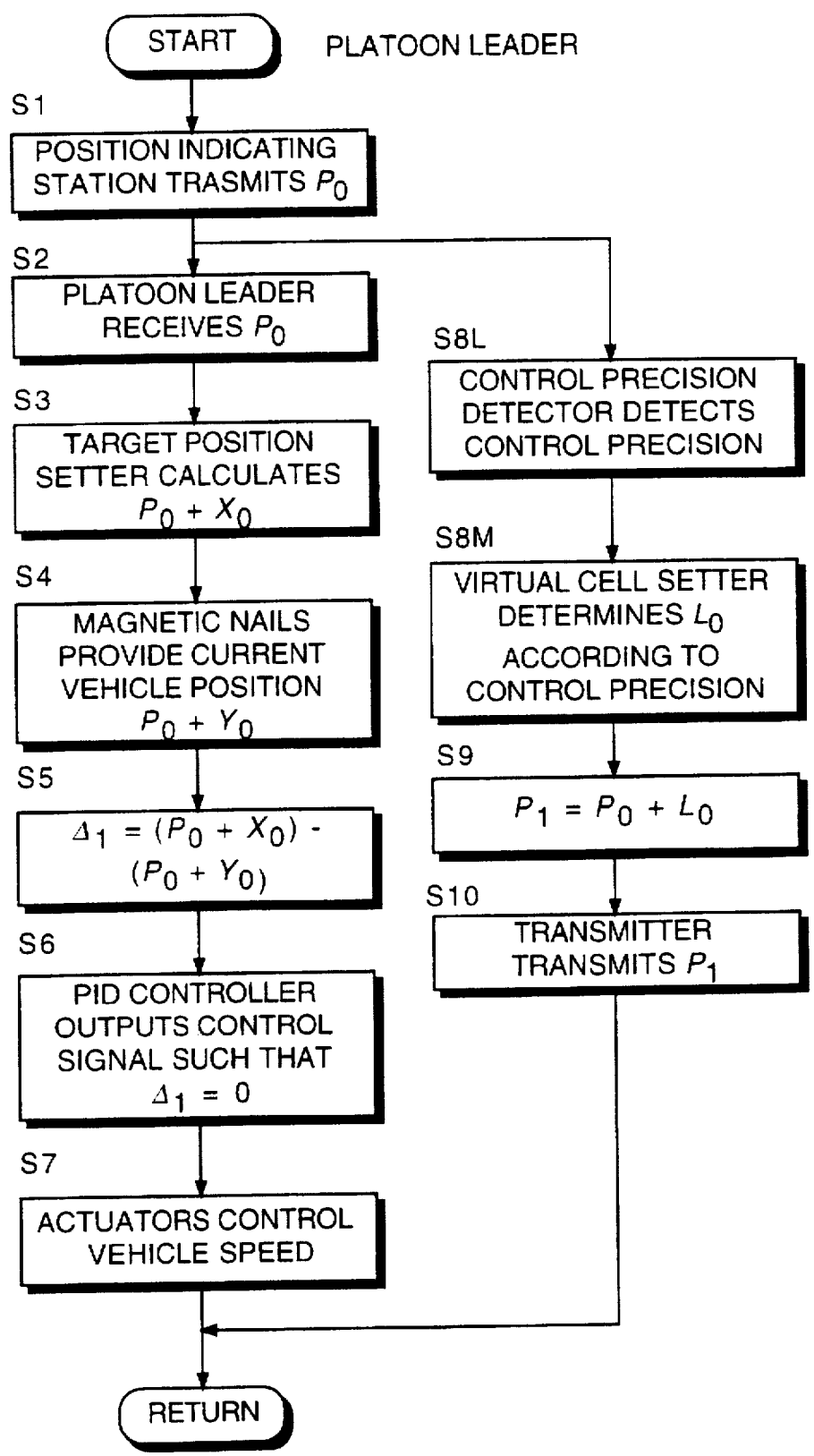
FIG. 21 is a flowchart describing a process for controlling the travel of the platoon leader according to the seventh embodiment.
Figure 22:
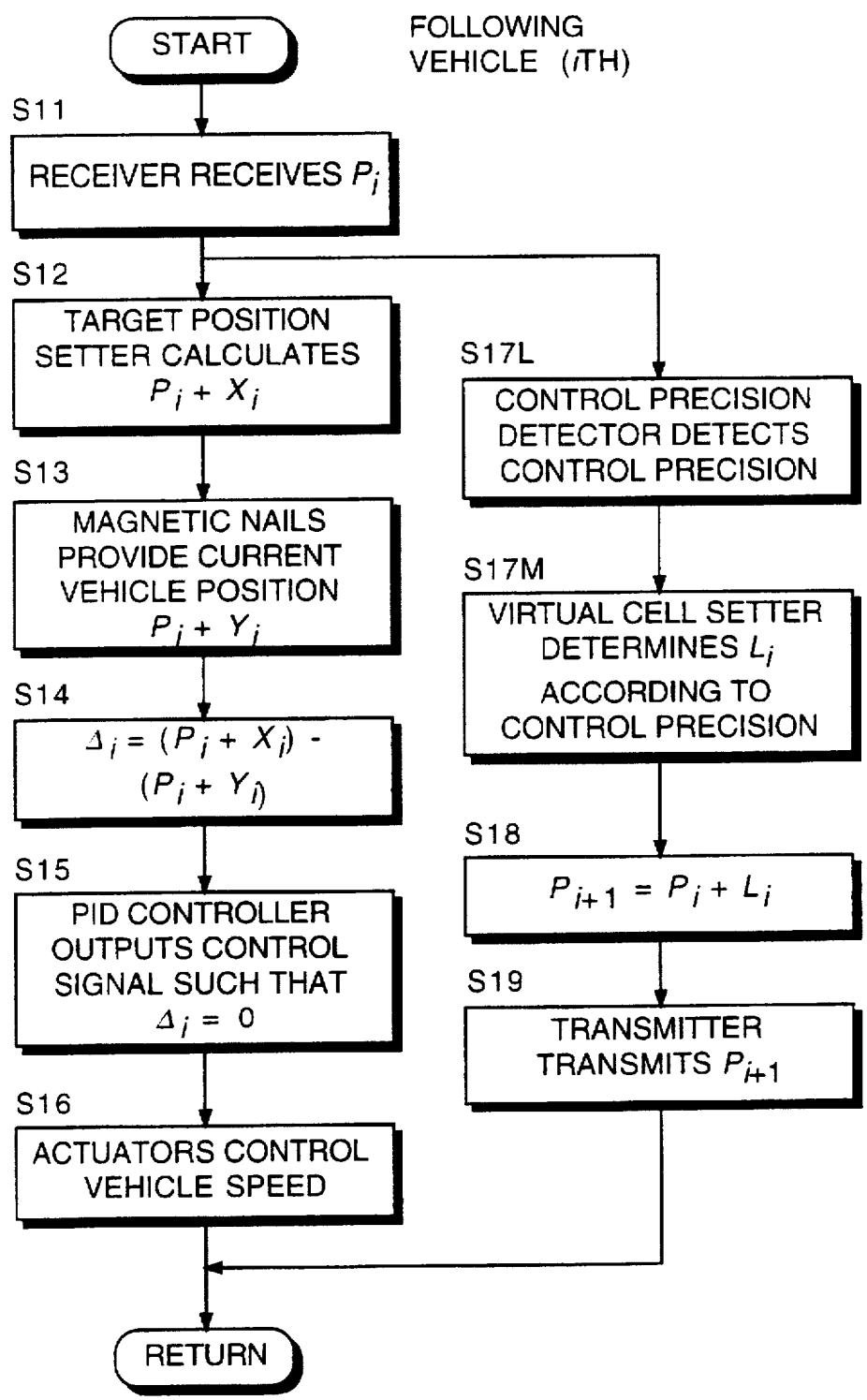
FIG. 22 is a flowchart describing a process for controlling the travel of the following vehicle according to the seventh embodiment.

The PID controller 50 controls the present position $P_i+Y_i$ of each vehicle so as to make it coincide with its present target position $P_i+X_i$, however some scatter in the control precision may occur for each vehicle. FIGS. 20–22 show a seventh embodiment related to correction for this scattering.

According to this embodiment, a control precision detector 21 which detects the control precision of a vehicle from the difference $\Delta_i$ between its present position and its target position, is provided as shown in FIG. 20. Hence, as shown by steps 8L, 8M and steps 17L, 17M in the flowcharts of FIGS. 21 and 22, the virtual cell setter 51 corrects the value $L_0$ or $L_i$ of the virtual cell of the vehicle to a length depending on the control precision. More specifically, the control precision detector 21 calculates the average value of the difference $\Delta_i$ in unit time, i.e. the standard deviation, and the virtual cell setter 51 corrects the virtual cell set value $L_0$ or $L_i$ to a larger value, the larger the standard deviation. For example, scatter may occur in the travel control precision of each vehicle depending on the precision of each sensor, however if the virtual cell set value is corrected for each vehicle based on the standard deviation as according to this embodiment, the inter-vehicle distance required to absorb control errors is maintained, and the length of the whole vehicle group may be reduced.

The embodiments of this invention in which an exclusive property or privilege is claimed are defined as follows:

1. A vehicle longitudinal spacing controller for controlling a travel of a group of vehicles traveling in a line, each of said vehicles having a travel speed varying mechanism for varying a travel speed of said vehicle, said controller comprising:

means for setting a virtual cell for each vehicle allowing a predetermined distance in front of and behind said vehicle, first transmitting means for transmitting a signal indicative of a virtual cell front end position of a frontmost vehicle in the group to said frontmost vehicle, means for calculating a virtual cell front end position of a (i+1)th vehicle from said frontmost vehicle, from a virtual cell front end position and a virtual cell of a ith vehicle, where i ranges from 1 to the total number of vehicles in said group, second transmitting means for transmitting a signal indicative of the virtual cell front end position of said (i+1)th vehicle to said (i+1)th vehicle, means for setting a target position of each vehicle in said virtual cell, means for detecting a real position of each vehicle in said virtual cell, and means for controlling said travel speed varying mechanism such that said real position coincides with said target position of each vehicle.

2. A vehicle longitudinal spacing controller as defined in claim 1, wherein each vehicle is provided with said virtual cell setting means, said target position setting means, said real position detecting means and said control means, each vehicle except the last vehicle in the group is provided with said calculating means and said second transmitting means, and said first transmitting means is provided independently of the group.

3. A vehicle longitudinal spacing controller as defined in claim 1, wherein said controller further comprises magnetic nails emitting magnetic pulses disposed at equidistant intervals on a road on which the group is traveling, and said position detecting means comprises a magnetic sensor for detecting said magnetic pulses and a pulse counter for integrating said pulses.

4. A vehicle longitudinal spacing controller as defined in claim 1, wherein said position detecting means comprises a GPS receiver.

5. A vehicle longitudinal spacing controller as defined in claim 1, wherein said first transmitting means comprises a base station for specifying the virtual cell front end position of said frontmost vehicle with time and a transmitting device for transmitting said virtual cell front end position to said frontmost vehicle.

6. A vehicle longitudinal spacing controller as defined in claim 1, wherein said controller further comprises means for detecting a vehicle speed of each vehicle, and said virtual cell setting means sets said virtual cell to a larger value the larger said vehicle speed.

7. A vehicle longitudinal spacing controller as defined in claim 1, wherein said controller further comprises means for detecting a weight of each vehicle, and said virtual cell setting means sets said virtual cell to a larger value the larger said weight.

8. A vehicle longitudinal spacing controller as defined in claim 1, wherein said controller further comprises means for detecting a frictional coefficient between the tires of said vehicles and a road surface on which said vehicles are traveling, and said virtual cell setting means sets said virtual cell to a larger value the smaller said frictional coefficient.

9. A vehicle longitudinal spacing controller as defined in claim 1, wherein said controller further comprises means for detecting a rainfall, and said virtual cell setting means sets said virtual cell to a larger value when the rainfall is detected.

10. A vehicle longitudinal spacing controller as defined in claim 1, wherein said controller further comprises means for detecting a throttle opening of an engine driving each vehicle, means for detecting a travel speed of each vehicle, and means for determining whether or not each vehicle is traveling on a descending slope based on the throttle opening and travel speed of each vehicle, and said virtual cell setting means sets said virtual cell to a larger value when said vehicle is traveling on a descending slope.

11. A vehicle longitudinal spacing controller as defined in claim 1, wherein said controller further comprises means for detecting a gradient of a road surface on which said vehicles are traveling, and said virtual cell setting means sets said virtual cell based on said road surface gradient.

12. A vehicle longitudinal spacing controller as defined in claim 1, further comprising means for arbitrarily varying said virtual cell of each vehicle.

13. A vehicle longitudinal spacing controller as defined in claim 1, wherein said controller further comprises means for calculating a standard deviation of difference between said real position and said target position of each vehicle, and said virtual cell setting means sets said virtual cell to a larger value the larger said standard deviation.

* * * * *